(12) United States Patent
Sundararajan et al.

(10) Patent No.: US 8,130,776 B1
(45) Date of Patent: Mar. 6, 2012

(54) METHOD AND APPARATUS PROVIDING NETWORK CODING BASED FLOW CONTROL

(75) Inventors: Jay Kumar Sundararajan, San Diego, CA (US); Devavrat Shah, Newton, MA (US); Muriel Medard, Belmont, MA (US); Michael Mitzenmacher, Lexington, MA (US); Joao Barros, Oporto (PT); Szymon Jakubczak, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 175 days.

(21) Appl. No.: 12/549,925

(22) Filed: Aug. 28, 2009

(51) Int. Cl.
    *H04L 12/56* (2006.01)
    *H04L 12/66* (2006.01)

(52) U.S. Cl. ........................... 370/401; 370/463

(58) Field of Classification Search .................. 370/400, 370/401, 431, 432, 462, 463
See application file for complete search history.

(56) References Cited

U.S. PATENT DOCUMENTS

| | | | |
|---|---|---|---|
| 7,912,003 B2* | 3/2011 | Radunovic et al. | 370/329 |
| 2010/0046371 A1* | 2/2010 | Sundararajan et al. | 370/400 |

* cited by examiner

*Primary Examiner* — Aung S Moe
*Assistant Examiner* — Kerri Rose
(74) *Attorney, Agent, or Firm* — Chapin IP Law, LLC; David W. Rouille, Esq.

(57) ABSTRACT

A method, apparatus and computer program product for providing network based flow control is presented. A linear combination of packets to transmit from a transmit queue is determined. The linear combination of packets is transmitted across a network using a sliding window protocol. An acknowledgement (ACK) is generated, wherein a packet is acknowledged when a receiving node receives the linear combination of packets and determines which packet of the linear combination of packets has been newly seen.

42 Claims, 17 Drawing Sheets

Fig. 6. Throughput vs redundancy for TCP/NC

METHOD AND APPARATUS PROVIDING NETWORK CODING BASED FLOW CONTROL

GOVERNMENT RIGHTS

This work is supported by subcontract number 18870740-37362-C issued by Stanford University and supported by DARPA, NSF Grant No. CNS-0627021 and subcontract number 060786 issued by BAE Systems and supported by DARPA and SPAWARSYSCEN under Contract number N66001-06-C-2020, and S0176938 issued by UC Santa Cruz supported by the United States Army under Award No. W911NF-05-1-0246, DARPA Grant No. HR0011-08-1-0008 and subcontract number 069145 issued by BAE Systems and supported by the DARPA and SPAWARSYSCEN under Contract No. N66001-08-C-2013. The government has certain rights in the invention.

This invention was made with government support under Grant No. W911NF-07-1-0029 awarded by the Army Research Office, Grant Number N66001-06-C-2020 awarded by the Defense Advanced Research Projects Agency, and Grant Numbers CNS0627021, CNS0721491, and CCF0634923 awarded by the National Science Foundation. The government has certain rights in this invention.

BACKGROUND

Network coding has emerged as an important potential approach to the operation of communication networks, especially wireless networks. The major benefit of network coding stems from its ability to mix data, across time and across flows. This makes data transmission over lossy wireless networks robust and effective.

Linear network coding was originally introduced for the case of error-free networks with specified link capacities, and was extended to the case of erasure networks. The linear network coding solution does not require decoding at intermediate nodes and can be applied in any network. Each node transmits a linear combination of all coded packets it has received so far. This solution ensures that with high probability, the transmitted packet will have what is called the innovation guarantee property, i.e., it will be innovative to every receiver that receives it successfully, except if the receiver already knows as much as the sender. An innovative packet is a linear combination of packets which is linearly independent of previously received linear combinations, and thus conveys new information. Thus, every successful reception will bring a unit of new information. This scheme is shown to achieve capacity for the case of a multicast session.

The Transmission Control Protocol (TCP) was originally developed for wired networks. Since wired networks have very little packet loss on the links and the predominant source of loss is buffer overflow due to congestion, TCP's approach of inferring congestion from losses works well. In contrast, wireless networks are characterized by packet loss on the link and intermittent connectivity due to fading.

SUMMARY

Conventional mechanisms such as those explained above suffer from a variety of deficiencies. In considering the potential benefits of the TCP-compatible network coding solution, the area of wireless links is of particular interest. It is well known that TCP is not well suited for lossy links, which are generally more prevalent in wireless systems. TCP performs poorly on lossy links primarily because it is designed to interpret each loss as a congestion signal. Adapting TCP for wireless scenarios is a very well-studied problem. The general approach has been to mask losses from TCP using link layer retransmission. However, it has been noted that the interaction between link layer retransmission and TCP's retransmission can be complicated and that performance may suffer due to independent retransmission protocols at different layers. More importantly, the benefits of approaches such as multipath opportunistic routing which exploit the broadcast nature of the wireless medium, link layer retransmission may not be the best approach. TCP wrongly assumes the cause of link losses to be congestion, and reduces its transmission rate unnecessarily, leading to low throughput. These problems of TCP in wireless networks are very well studied, and several solutions have been proposed.

Embodiments of the invention significantly overcome such deficiencies and provide mechanisms and techniques that provide a new approach to congestion control on lossy links based on the idea of random linear network coding. Also introduced is a new acknowledgment mechanism that plays a key role in incorporating coding into the congestion control algorithm. From an implementation perspective, a new network coding layer between the transport and network layers on both the source and receiver sides. Thus, requisite changes can be easily deployed in an existing system.

A technique is described that incorporates network coding into TCP with only minor changes to the protocol stack, thereby allowing incremental deployment. In the present invention, the source transmits random linear combinations of packets currently in the congestion window. At the heart of the techniques is a new interpretation of ACKs wherein the sink acknowledges every degree of freedom (i.e., a linear combination that reveals one unit of new information) even if it does not reveal an original packet immediately. Such ACKs enable a TCP-compatible sliding-window approach to network coding. By way of the current technique packet losses are essentially masked from the congestion control algorithm. The algorithm therefore reacts to packet drops in a smooth manner, resulting in a novel and effective approach for congestion control over networks involving links such as wireless links. The technique also allows intermediate nodes to perform re-encoding of the data packets. Simulations show that the algorithm, with or without re-encoding inside the network, achieves much higher throughput compared to TCP over lossy wireless links. Also described is the soundness and fairness of the algorithm, as well as a queuing analysis for the case of intermediate node re-encoding.

In a particular embodiment of a method in which a transmitting node performs operations for providing network coding based flow control, the method begins by determining a linear combination of packets to transmit from a transmit queue. The method also includes transmitting the linear combination of packets across a network using a sliding window protocol. The method further includes receiving an acknowledgement (ACK), wherein a packet is acknowledged when a receiving node receives the linear combination of packets and determines which packet of the linear combination of packets has been newly seen.

In a particular embodiment of a method in which a receiving node performs operations for providing network coding based flow control, the method begins by receiving a linear combination of packets across a network using a sliding window protocol. The method further includes determining whether a packet is newly seen. The concept of a newly seen packet is defined later. Additionally, the method includes transmitting an acknowledgement (ACK), wherein a packet is acknowledged when the receiving node receives the linear combination of packets and determines which packet of the linear combination of packets has been newly seen.

In a particular embodiment of a method in which an intermediate node performs operations for providing network coding based flow control, the method begins by receiving a linear combination of packets. The method also includes determining a linear combination of packets to transmit from a transmit queue. The method further includes transmitting the linear combination of packets across a network using a sliding window protocol.

Other embodiments include a computer readable medium having computer readable code thereon for providing a network coding based flow control at a transmitting node. The computer readable medium includes instructions for determining a linear combination of packets to transmit from a transmit queue. The computer readable medium also includes instructions for transmitting the linear combination of packets across a network using a sliding window protocol. The computer readable medium further includes instructions for receiving an acknowledgement (ACK), wherein a packet is acknowledged when a receiving node receives the linear combination of packets and determines which packet of the linear combination of packets has been newly seen.

Still other embodiments include a computer readable medium having computer readable code thereon for providing a network coding based flow control at a receiving node. The computer readable medium includes instructions for receiving a linear combination of packets across a network using a sliding window protocol. The computer readable medium further includes instructions for determining whether a packet is newly seen. Additionally, the computer readable medium includes instructions for transmitting an acknowledgement (ACK), wherein a packet is acknowledged when the receiving node receives the linear combination of packets and determines which packet of the linear combination of packets has been newly seen.

Yet another embodiment includes a computer readable medium having computer readable code thereon for providing a network coding based flow control at an intermediate node. The computer readable medium includes instructions for receiving a linear combination of packets. The computer readable medium also includes instructions for determining a linear combination of packets to transmit from a transmit queue. The computer readable medium further includes instructions for transmitting the linear combination of packets across a network using a sliding window protocol.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides network coding based flow control as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing network coding based flow control as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
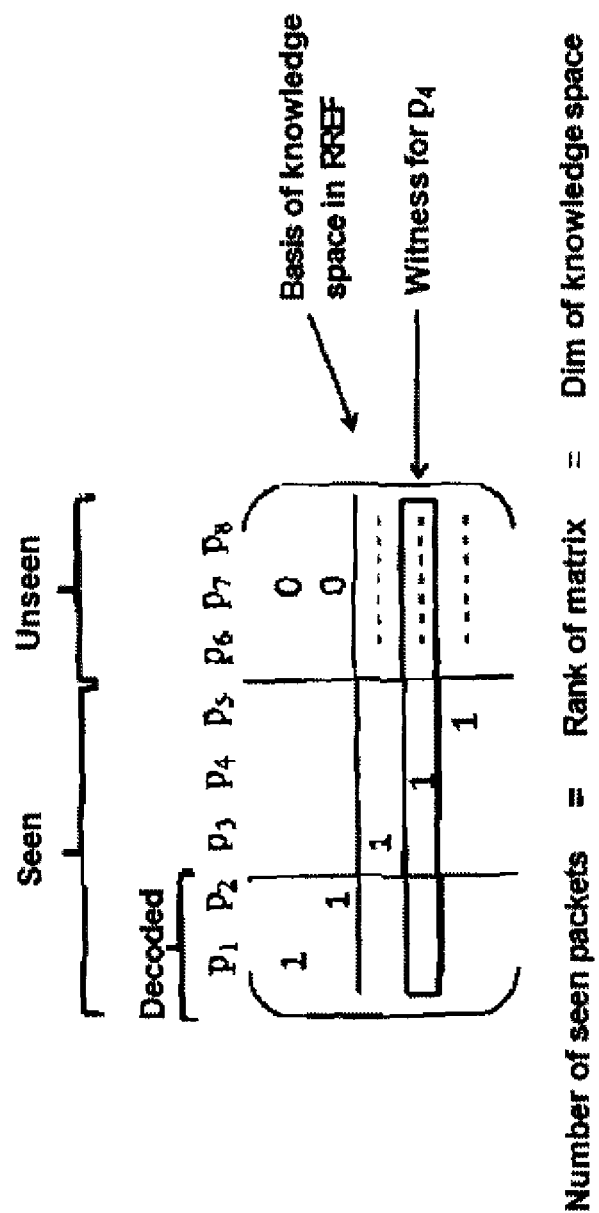
FIG. 1 comprises a diagram showing seen packets and witnesses in terms of a basis matrix.

In order to bring the ideas of network coding into practice, a protocol is required that brings out the benefits of network coding while requiring very little change in the protocol stack. Flow control and congestion control in today's Internet are predominantly based on the Transmission Control Protocol (TCP), which works using the idea of a sliding transmission window of packets, whose size is controlled based on feed-back. The TCP paradigm has clearly proven successful. It would therefore be desirable to provide a sliding-window approach as similar as possible to TCP for network coding that makes use of acknowledgments for flow and congestion control.

Such an approach would necessarily differ from the generation-based approach more commonly considered for network coding. Described below is how to incorporate network coding into TCP, allowing its use with minimal changes to the protocol stack, and in such a way that incremental deployment is possible.

The main idea behind TCP is to use acknowledgments of newly received packets as they arrive in correct sequence order in order to guarantee reliable transport and also to provide a feedback signal for the congestion control loop. This mechanism requires some modification for systems using network coding. The key difference to be dealt with is that under network coding the receiver does not obtain original packets of the message, but linear combinations of the packets that are then decoded to obtain the original message once enough such combinations have arrived. Hence, the notion of an ordered sequence of packets as used by TCP is missing, and further, a linear combination may bring in new information to a receiver even though it may not reveal an original packet immediately. The current ACK mechanism does not allow the receiver to acknowledge a packet before it has been decoded. For network coding, a modification of the standard TCP mechanism is required that acknowledges every unit of information received.

A new unit of information corresponds mathematically to a degree of freedom; essentially, once n degrees of freedom have been obtained, a message that would have required n unencoded packets can be decoded. Described herein is a mechanism that performs the functions of TCP, namely reliable transport and congestion control, based on acknowledging every degree of freedom received, whether or not it reveals a new packet.

A new network coding layer is introduced between the transport layer and the network layer of the protocol stack. Thus, the congestion control principle of TCP is recycled, namely that the number of packets involved in transmissions cannot exceed the number of acknowledgments received by more than the congestion window size. However, two main changes are introduced. First, whenever the source is allowed to transmit, it sends a random linear combination of all packets in the congestion window. Second, the receiver acknowledges degrees of freedom and not original packets. An appropriate interpretation of the degree of freedom allows one to order the receiver degrees of freedom in a manner consistent with the packet order of the source. This allows the standard TCP protocol to be utilized with the minimal change. In particular, a TCP-Vegas protocol is used, as this protocol is more compatible with the required modifications.

The present technique does not rely on the link layer for recovering losses. Instead, an erasure correction scheme based on random linear codes across packets is used. Coding across packets is a natural way to handle losses. A coding based approach is better suited for broadcast-mode opportunistic routing scenarios, as randomly chosen linear combinations of packets are more likely to convey new information, compared to retransmissions. The MORE scheme explains the benefits of network coding in the context of opportunistic routing. However, the problem with MORE is the batch processing that makes it less compatible to a sliding window protocol such as TCP. By providing an interface between TCP and a network coded system, a new approach is presented to implementing TCP over wireless networks, and it is here where the benefits of the presently disclosed method and apparatus for providing network coding based flow control are most dramatic.

It is important to note that the present scheme respects the end-to-end philosophy of TCP—it would work even if coding operations were performed only at the end hosts. Further, if some nodes inside the network also perform network coding, the present technique naturally generalizes to such scenarios as well.

Definitions are now introduced. Packets are treated as vectors over a finite field $F_q$ of size q. All the discussion here is with respect to a single source that generates a stream of packets. The $k^{th}$ packet that the source generates is said to have an index k and is denoted as $p_k$.

Definition 1 (Seeing a packet): A node is said to have seen a packet $p_k$ if it has enough information to compute a linear combination of the form $(p_k+q)$, where $q=\Sigma_{l>k}\alpha_l p_l$, with $\alpha_l \in F_q$ for all l>k. Thus, q is a linear combination involving packets with indices larger than k.

The notion of "seeing" a packet is a natural extension of the notion of "decoding" a packet, or more specifically, receiving a packet in the context of classical TCP. For example, if a packet is decoded then it is indeed also seen, with q=0. A node can compute any linear combination whose coefficient vector is in the span of the coefficient vectors of previously received linear combinations. This leads to the following definition.

Definition 2 (Knowledge of a node): The knowledge of a node is the set of all linear combinations of original packets that it can compute, based on the information it has received so far. The coefficient vectors of these linear combinations form a vector space called the knowledge space of the node.

Proposition 1: If a node has seen packet $p_k$ then it knows exactly one linear combination of the form $p_k+q$ such that q is itself a linear combination involving only unseen packets. The above proposition inspires the following definition.

Definition 3 (Witness): The unique linear combination guaranteed by Proposition 1 is called the witness for seeing $p_k$.

A compact representation of the knowledge space is the basis matrix. This is a matrix in row-reduced echelon form (RREF) such that its rows form a basis of the knowledge space. FIG. 1 explains the notion of a seen packet in terms of the basis matrix. Essentially, the seen packets are the ones that correspond to the pivot columns of the basis matrix. Given a seen packet, the corresponding pivot row gives the coefficient vector for the witness linear combination. An important observation is that the number of seen packets is always equal to the dimension of the knowledge space, or the number of degrees of freedom that have been received so far. A newly received linear combination that increases the dimension is said to be innovative. It is assumed that the field size is very large. As a consequence, each reception will be innovative with high probability, and will cause the next unseen packet to be seen.

Example: Suppose a node knows the following linear combinations: $x=(p_1+p_2)$ and $y=(p_1+p_3)$. Since these are linearly independent, the knowledge space has a dimension of 2. Hence, the number of seen packets must be 2. It is clear that packet $p_1$ has been seen, since x satisfies the requirement of Definition 1. Now, the node can compute $z \triangleq x-y=(p_2-p_3)$. Thus, it has also seen $p_2$. That means $p_3$ is unseen. Hence, y is the witness for $p_i$, and z is the witness for $p_2$.

In this section, the logical description of the new protocol is presented, followed by a way to implement these ideas with as little disturbance as possible to the existing protocol stack.

One aim of the present algorithm is to mask losses from TCP using random linear coding. Some important modifications are made in order to incorporate coding. First, instead of the original packets, random linear combinations of packets in the congestion window are transmitted. While such coding helps with erasure correction, it also leads to a problem in acknowledging data. TCP operates with units of packets, which have a well-defined ordering. Thus, the packet sequence number can be used for acknowledging the received data. The unit in the present protocol is a degree of freedom. However, when packets are coded together, there is no clear ordering of the degrees of freedom that can be used for ACKs. The notion of seen packets defines an ordering of the degrees of freedom that is consistent with the packet sequence numbers, and can therefore be used to acknowledge degrees of freedom.

Upon receiving a linear combination, the sink finds out which packet, if any, has been newly seen because of the new arrival and acknowledges that packet. The sink thus pretends to have received the packet even if it cannot be decoded yet. It will be shown below that at the end this is not a problem because if all the packets in a file have been seen, then they can all be decoded as well.

The idea of transmitting random linear combinations and acknowledging seen packets achieves the goal of masking losses from TCP as follows. With a large field size, every random linear combination is very likely to cause the next unseen packet to be seen. So, even if a transmitted linear combination is lost, the next successful reception will cause the next unseen packet to be seen. From TCP's perspective, this appears as though the degree of freedom waits in a fictitious queue until the channel stops erasing packets and allows it through. Thus, there will never be any duplicate ACKs. Every ACK will cause the congestion window to advance. In short, the lossiness of the link is presented to TCP as an additional queuing delay that leads to a larger effective round-trip time. The term round-trip time thus has a new interpretation. It is the effective time the network takes to reliably deliver a degree of freedom (including the delay for the coded redundancy, if necessary), followed by the return of the ACK. This is larger than the true network delay it takes for a transmission and the return of the ACK. The more lossy the link is, the larger will be the effective RTT. Presenting TCP with a larger value for RTT may seem counterintuitive as TCP's rate is inversely related to RTT. However, if done correctly, it improves the rate by preventing loss-induced window closing, as it gives the network more time to deliver the data in spite of losses, before TCP times out. Therefore, losses are effectively masked.

Now discussed will be how the effectively masked losses affect congestion control. Since losses are masked from the congestion control algorithm, the TCP-Reno style approach to congestion control using packet loss as a congestion indicator is not well suited to this situation. However, it is useful to note that the congestion related losses are made to appear as a longer RTT. Therefore, an approach is needed that infers congestion from an increase in RTT. The natural choice is TCP-Vegas.

TCP-Vegas uses a proactive approach to congestion control by inferring the size of the network buffers even before they start dropping packets. The crux of the algorithm is to estimate the round-trip time (RTT) and use this information to find the discrepancy between the expected and actual transmission rate. As congestion arises, buffers start to fill up and the RTT starts to rise, and this is used as the congestion signal. This signal is used to adjust the congestion window and hence the rate.

In order to use TCP-Vegas correctly in this setting, the effective RTT of a degree of freedom needs to be used, including the fictitious queuing delay. In other words, the RTT should be measured from the point when a packet is first sent out from TCP, to the point when the ACK returns saying that this packet has been seen. This is indeed the case for the default RTT measurement mechanism of TCP-Vegas. The TCP sender notes down the transmission time of every packet. When an ACK arrives, it is matched to the corresponding transmit timestamp in order to compute the RTT. Thus, no modification is required.

Figure 2:
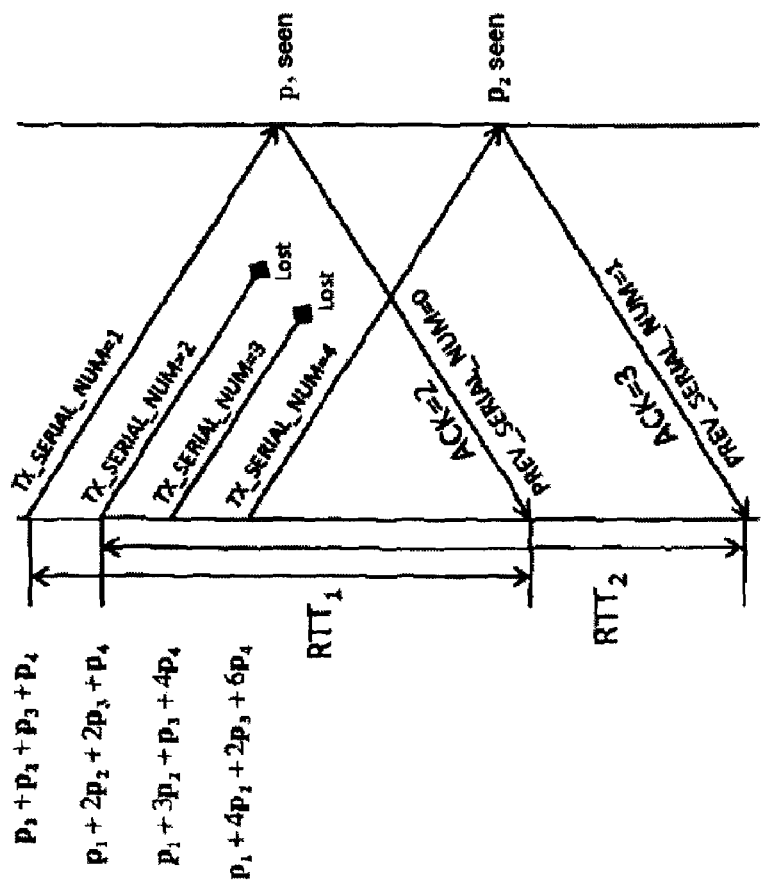
FIG. 2 depicts an example of coding and ACKs.

Consider the example shown in FIG. 2. Suppose the congestion window's length is four. Assume TCP sends 4 packets to the network coding layer at t=0. All four transmissions are linear combinations of these four packets. The $1^{st}$ transmission causes the $1^{st}$ packet to be seen. The $2^{nd}$ and $3^{rd}$ transmissions are lost, and the $4^{th}$ transmission causes the $2^{nd}$ packet to be seen (the discrepancy is because of losses). As far as the RTT estimation is concerned, transmissions 2, 3 and 4 are treated as attempts to convey the $2^{nd}$ degree of freedom. The RTT for the $2^{nd}$ packet must include the final attempt that successfully delivers the $2^{nd}$ degree of freedom, namely the $4^{th}$ transmission. In other words, the RTT is the time from t=0 until the reception of ACK=3.

Figure 3:
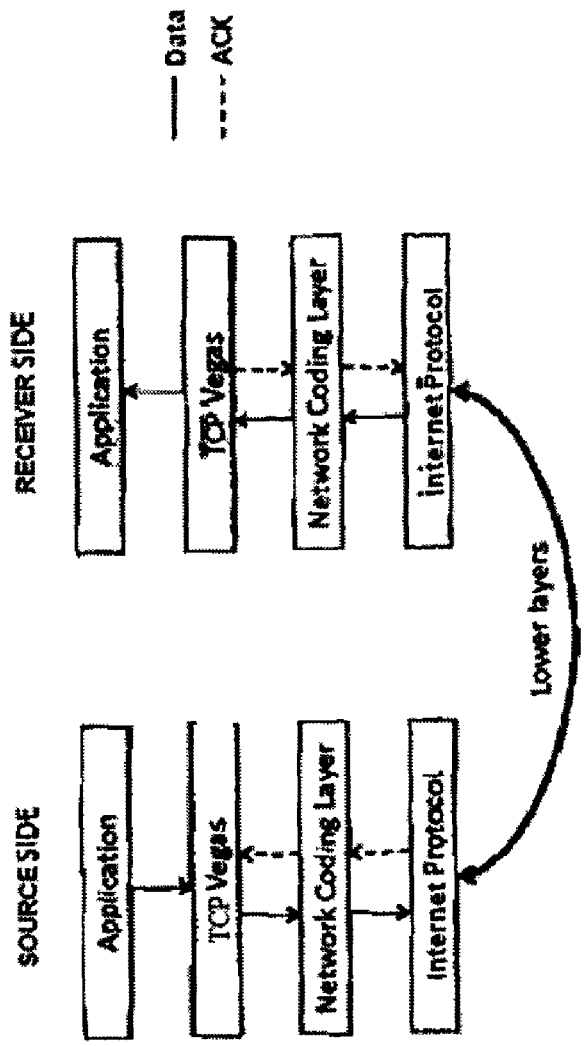
FIG. 3 depicts a protocol stack showing a new network coding layer.

The implementation of all these ideas in the existing protocol stack needs to be done in as non-intrusive a manner as possible. A solution is presented which embeds the network coding operations in a separate layer below TCP and above IP on the source and receiver side, as shown in FIG. 3. The exact operation of these modules will now be described.

The sender module accepts packets from the TCP source and buffers them into an encoding buffer which represents the coding window, until they are ACKed by the receiver. The sender then generates and sends random linear combinations of the packets in the coding window. The coefficients used in the linear combination are also conveyed in the header.

For every packet that arrives from TCP, R linear combinations are sent to the IP layer on average, where R is the redundancy parameter. The average rate at which linear combinations are sent into the network is thus a constant factor more than the rate at which TCP's congestion window progresses. This is necessary in order to compensate for the loss rate of the channel and to match TCP's sending rate to the rate at which data is actually sent to the receiver. If there is too little redundancy, then the data rate reaching the receiver will not match the sending rate because of the losses. This leads to a situation where the losses are not effectively masked from the TCP layer. Hence, there are frequent losses leading to a low throughput. On the other extreme, too much redundancy is also bad, since then the transmission rate becomes limited by the rate of the code itself. Besides, sending too many linear combinations can congest the network. The ideal level of redundancy is to keep R equal to the reciprocal of the probability of successful reception. Thus, in practice the value of R should be dynamically adjusted by estimating the loss rate, possibly using the RTT estimates.

Upon receiving a linear combination, the receiver module first retrieves the coding coefficients from the header and appends it to the basis matrix of its knowledge space. Then, it performs a Gaussian elimination to find out which packet is newly seen so that this packet can be ACKed. The receive module also maintains a buffer of linear combinations of packets that have not been decoded yet. Upon decoding the packets, the receiver delivers them to the TCP sink.

The algorithm is specified below using pseudo-code. This specification assumes a one-way TCP flow.

1) Source side: The source side algorithm has to respond to two types of events—the arrival of a packet from the source TCP, and the arrival of an ACK from the receiver via IP.
  1. Set NUM to 0.
  2. Wait state: If any of the following events occurs, respond as follows; else, wait.
  3. Packet arrives from TCP sender:
    a) If the packet is a control packet used for connection management, deliver it to the IP layer and return to wait state.
    b) If packet is not already in the coding window, add it to the coding window.
    c) Set NUM=NUM+R. (R=redundancy factor)
    d) Repeat the following $\lfloor NUM \rfloor$ times:
      i) Generate a random linear combination of the packets in the coding window.
      ii) Add the network coding header specifying the set of packets in the coding window and the coefficients used for the random linear combination.
      iii) Deliver the packet to the IP layer.
    e) Set NUM:=fractional part of NUM.
    f) Return to the wait state.
  4. ACK arrives from receiver: Remove the ACKed packet from the coding buffer and hand over the ACK to the TCP sender.

2) Receiver side: On the receiver side, the algorithm again has to respond to two types of events: the arrival of a packet from the source, and the arrival of ACKs from the TCP sink.
  1. Wait state: If any of the following events occurs, respond as follows; else, wait.
  2. ACK arrives from TCP sink: If the ACK is a control packet for connection management, deliver it to the IP layer and return to the wait state; else, ignore the ACK.
  3. Packet arrives from source side:
    a) Remove the network coding header and retrieve the coding vector.
    b) Add the coding vector as a new row to the existing coding coefficient matrix, and perform Gaussian elimination to update the set of seen packets.
    c) Add the payload to the decoding buffer. Perform the operations corresponding to the Gaussian elimination on the buffer contents. If any packet gets decoded in the process, deliver it to the TCP sink and remove it from the buffer.
    d) Generate a new TCP ACK with sequence number equal to that of the oldest unseen packet.

The present protocol guarantees reliable transfer of information. In other words, every packet in the packet stream generated by the application at the source will be delivered eventually to the application at the sink. The acknowledgment mechanism ensures that the coding module at the sender does not remove a packet from the coding window unless it has been ACKed, i.e., unless it has been seen by the sink. Thus, if all packets in a file have been seen, then the file can be decoded at the sink.

Theorem 1: From a file of n packets, if every packet has been seen, then every packet can also be decoded.

Proof: If the sender knows a file of n packets, then the sender's knowledge space is of dimension n. Every seen packet corresponds to a new dimension. Hence, if all n packets have been seen, then the receiver's knowledge space is also of dimension n, in which case it must be the same as the sender's and all packets can be decoded.

In other words, seeing n different packets corresponds to having n linearly independent equations in n unknowns. Hence, the unknowns can be found by solving the system of equations. At this point, the file can be delivered to the TCP sink. In practice, one does not have to necessarily wait until the end of the file to decode all packets. Some of the unknowns can be found even along the way. In particular, whenever the number of equations received catches up with the number of unknowns involved, the unknowns can be found. Now, for every new equation received, the receiver sends an ACK. The congestion control algorithm uses the ACKs to control the injection of new unknowns into the coding window. Thus, the discrepancy between the number of equations and number of unknowns does not tend to grow with time, and therefore will hit zero often based on the channel conditions. As a consequence, the decoding buffer will tend to be stable.

An interesting observation is that the arguments used to show the soundness of our approach are quite general and can be extended to more general scenarios such as random linear coding based multicast over arbitrary topologies.

Figure 4:
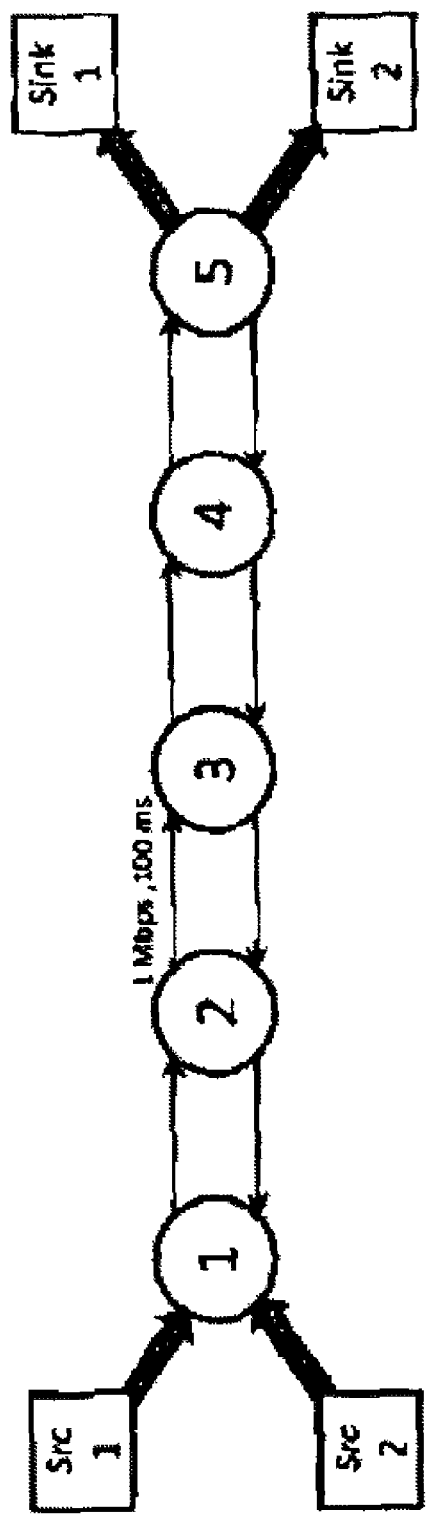
FIG. 4 comprises a diagram of a simulation topology.

The protocol described above is simulated using the Network Simulator (ns-2). The topology for the simulations is a tandem network consisting of 4 hops (hence 5 nodes), shown in FIG. 4. The source and sink nodes are at opposite ends of the chain. Two FTP applications want to communicate from the source to the sink. There is no limit on the file size. They emit packets continuously till the end of the simulation. They either use TCP without coding or TCP with network coding (denoted TCP/NC). In this simulation, intermediate nodes do not re-encode packets. All the links have a bandwidth of 1 Mbps, and a propagation delay of 100 ms. The buffer size on the links is set at 200. The TCP receive window size is set at 100 packets, and the packet size is 1,000 bytes. The Vegas parameters are chosen to be $\alpha=28$, $\beta=30$, $\gamma=2$.

By fairness, if two similar flows compete for the same link, they must receive an approximately equal share of the link bandwidth. In addition, this must not depend on the order in which the flows join the network. The fairness of TCP-Vegas is a well-studied problem. It is known that, depending on the values chosen for the α and β parameters, TCP-Vegas could be unfair to an existing connection when a new connection enters the bottleneck link. In the present simulations, values of α and β are chosen that allow fair sharing of bandwidth when two TCP flows without our modification compete with each other, in order to evaluate the effect of the modification on fairness. With the same α and β two cases are considered:

Case 1: The situation where a network coded TCP flow competes with another flow running TCP without coding.

Case 2: The situation where two coded TCP flows compete with each other.

Figure 5:
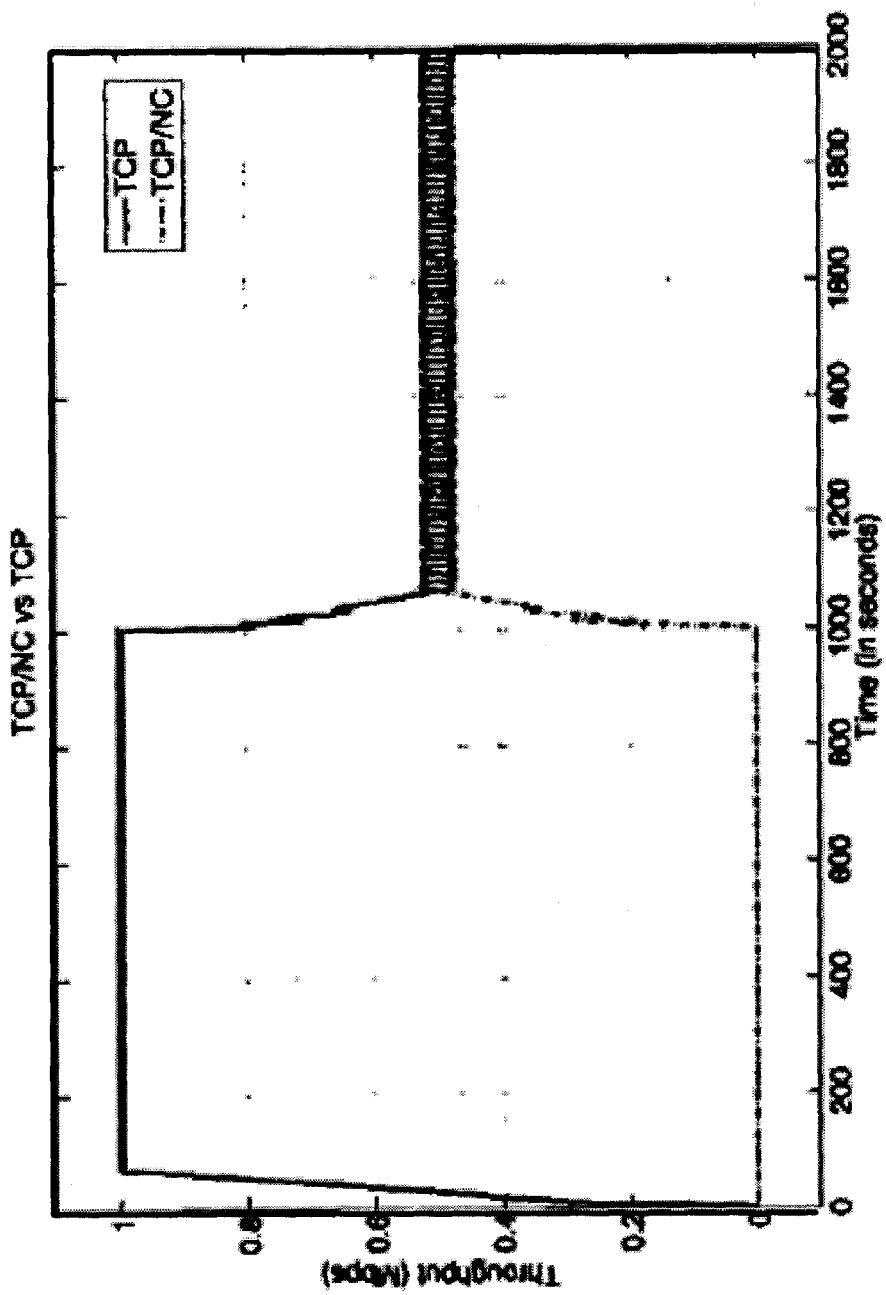
FIG. 5 comprises a diagram showing fairness and compatibility for one TCP/NC flow and one TCP flow.

In both cases, the loss rate is set to 0% and the redundancy parameter is set to 1 for a fair comparison. In the first case, the TCP flow starts first at t=0.5 s and the flow starts at 1000 s. The system is simulated for 2000 s. The current throughput is calculated at intervals of 2.5 s. The evolution of the throughput over time is shown in FIG. 5. FIGS. 5-8 are based on Simulations. FIG. 5 shows that the effect of introducing the coding layer does not affect fairness. After the second flow starts, the bandwidth gets redistributed fairly.

For case 2, the experiment is repeated with the same starting times, but this time both flows are TCP/NC flows. The plot for this case is essentially identical to FIG. 5 (and hence is not shown here) because in the absence of losses, TCP/NC behaves identically to TCP if the effects of field size are ignored. Thus, coding can coexist with TCP in the absence of losses, without affecting fairness. The new protocol indeed achieves a high throughput, especially in the presence of losses.

A. Throughput of the New Protocol Simulation Results

The simulation setup is identical to that used in the fairness simulations. The effect of the redundancy parameter on the throughput of TCP/NC for a fixed loss rate of 5% is shown. The loss rate, refers to the probability of a packet getting lost on each link. Both packets in the forward direction as well as ACKs in the reverse direction are subject to these losses. No re-encoding is allowed at the intermediate nodes. Hence, the overall probability of packet loss across 4 hops is given by $1-(1-0.05)^4$ which is roughly 19%. Hence the capacity is roughly 0.81 Mbps, which when split fairly gives 0.405 Mbps per flow. The simulation time is 10000 s.

Figure 6:
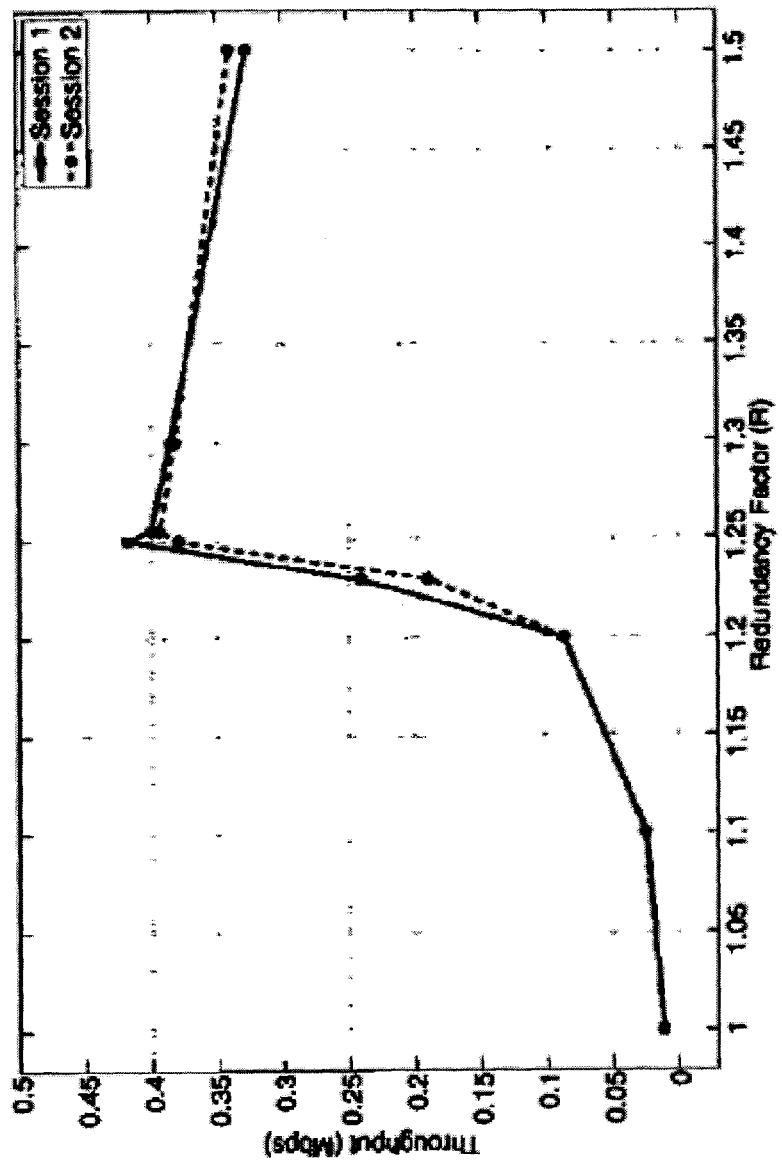
FIG. 6 comprises a diagram showing throughput versus redundancy for TCP/NC flows.

Two TCP/NC flows are allowed to compete on this network, both starting at 0.5 s. Their redundancy parameter is varied between 1 and 1.5. The theoretically optimum value is approximately $1/(1-0.19) \approx 1.23$. FIG. 6 shows the plot of the throughput for the two flows, as a function of the redundancy parameter R. It is clear from the plot that R plays an important role in TCP/NC. The throughput peaks around R=1.25. The peak throughput achieved is 0.397 Mbps, which is indeed close to the capacity calculated above. In the same situation, when two TCP flows compete for the network, the two flows see a throughput of 0.0062 and 0.0072 Mbps respectively. Thus, with the correct choice of R, the throughput for the flows in the case is very high compared to the TCP case. In fact, even with R=1, TCP/NC achieves about 0.011 Mbps for each flow improving on TCP by almost a factor of 2.

Figure 7:
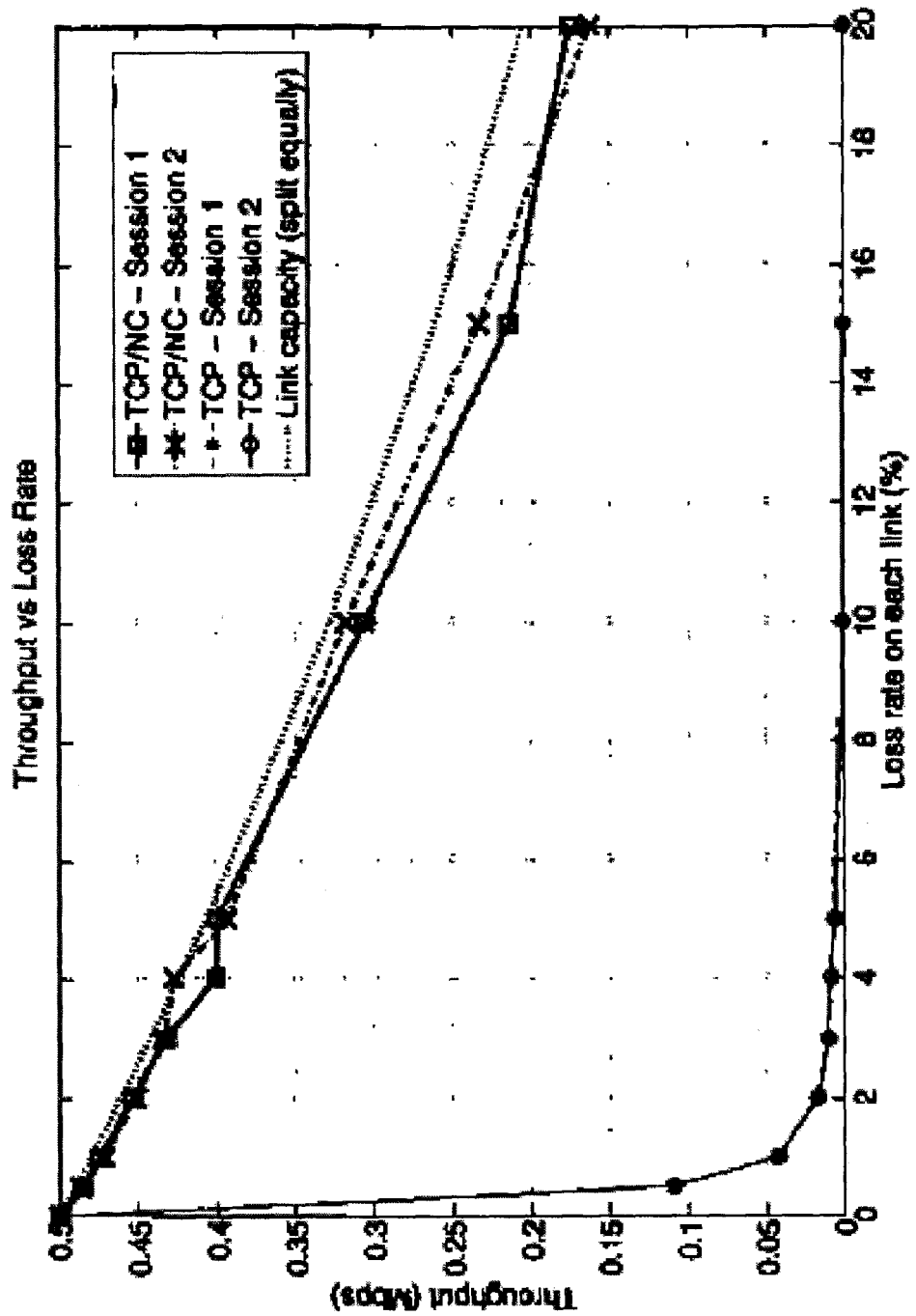
FIG. 7 comprises a diagram showing throughput versus loss rate for TCP and TCP/NC flows.

Next, the variation of throughput with loss rate for both TCP and TCP/NC will be discussed. The simulation parameters are all the same as above. The loss rate of all links is kept at the same value, and this is varied from 0 to 20%. We compare two scenarios-two TCP flows competing with each other, and two TCP/NC flows competing with each other. For the TCP/NC case, the redundancy parameter is set at the optimum value corresponding to each loss rate. FIG. 7 shows that throughput falls rapidly as losses increase. However, TCP/NC is very robust to losses and reaches a throughput that is close to capacity. (If p is the loss rate on each link, then capacity is $(1-p)^4$, which must then be split equally.)

Figure 8:
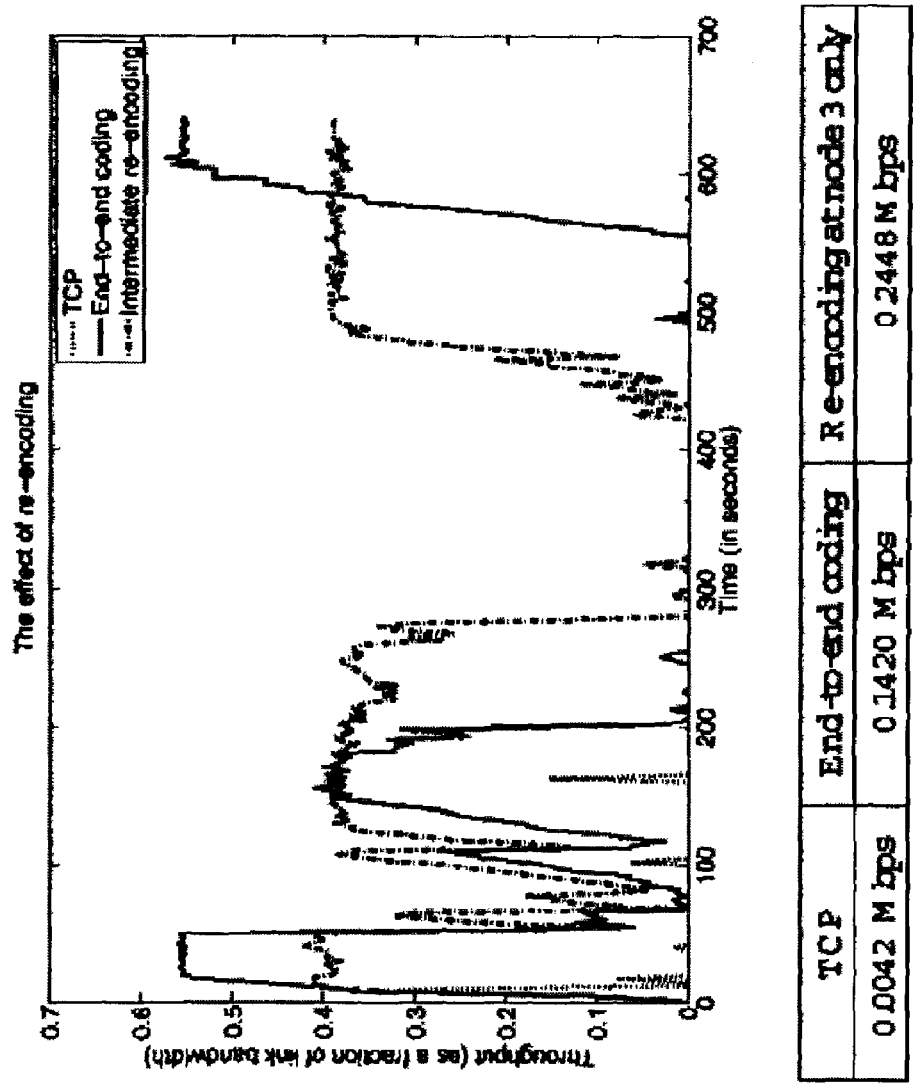
FIG. 8 comprises a diagram showing throughput with and without intermediate node re-coding.

FIG. 8 shows the instantaneous throughput in a 642 second long simulation of a tandem network with 3 hops (i.e., 4 nodes), where erasure probabilities vary with time in some specified manner. The third hop is on average, the most erasure-prone link. The plots are shown for traditional TCP, TCP/NC with coding only at the source, and TCP/NC with re-encoding at node 3 (just before the worst link). The operation of the re-encoding node is very similar to that of the source—it collects incoming linear combinations in a buffer, and transmits, on average, $R_{int}$ random linear combinations of the buffer contents for every incoming packet. The R of the sender is set at 1.8, and the $R_{int}$ of node 3 is set at 1.5 for the case when it re-encodes. The average throughput is shown in the table. A considerable improvement is seen due to the coding, that is further enhanced by allowing intermediate node re-encoding. This plot thus shows that the present scheme is also suited to systems with coding inside the network.

These simulations are meant to be a preliminary study of the present algorithm's performance. Specifically, the following points must be noted:

Link layer retransmission is not considered for either TCP or TCP/NC. If allowed, this could improve the performance of TCP. However, as mentioned earlier, the retransmission approach does not extend to more general multipath routing solutions, whereas coding is better suited to such scenarios.

The throughput values do not account for the overhead associated with the network coding headers. The main overhead is in conveying the coding coefficients and the contents of the coding window. If the source and sink share a pseudo-random number generator, then the coding coefficients can be conveyed succinctly by sending the current state of the generator. Similarly, the coding window contents can be conveyed in an incremental manner to reduce the overhead.

The loss in throughput due to the finiteness of the field has not been modeled in the simulations. A small field might cause received linear combinations to be non-innovative, or might cause packets to be seen out of order, resulting in duplicate ACKs. However, the probability that such problems persist for a long time falls rapidly with the field size. For practical choices of field size, these issues will only cause transient effects that will not have a significant impact on performance.

In this section, an idealized scenario is discussed in order to provide a first order analysis of the new protocol. The key ideas of the present protocol are explained with emphasis on the interaction between the coding operation and the feedback. The model used in this section will also serve as a platform to incorporate more practical situations. The congestion control aspect of the problem is abstracted out by assuming that the capacity of the system is fixed in time and known at the source, and hence the arrival rate is always maintained below the capacity. It is also assumed that nodes have infinite capacity buffers to store packets. A topology that consists of a chain of erasure-prone links in tandem is discussed, with perfect end-to-end feedback from the sink directly to the source. In such a system, the behavior of the queue sizes at various nodes is discussed.

System model: The network studied in this section is a daisy chain of N nodes, each node being connected to the next one by a packet erasure channel. A slotted time system is assumed. The source generates packets according to a Bernoulli process of rate λ packets per slot. The point of transmission is at the very beginning of a slot. Just after this point, every node transmits one random linear combination of the packets in its queue. Propagation delay is ignored. Thus, the transmission, if not erased by the channel, reaches the next node in the chain almost immediately. However, the node may use the newly received packet only in the next slot's transmission. Perfect, delay-free feedback from the sink to the source is assumed. In every slot, the sink generates the feedback signal after the instant of reception of the previous node's transmission. The erasure event happens with a probability $(1-\mu_i)$ on the channel connecting node i and (i+1), and is assumed to be independent across different channels and over time. Thus, the system has a capacity $\min_i \mu_i$ packets per slot. A further assumption is made that $\lambda < \min_i \mu_i$, and the load factor is defined as $p_i = \lambda/\mu_i$. The relation between the transmitted linear combination and the original packet stream is conveyed in the packet header. This overhead is ignored for the analysis in this section.

This model and the following analysis also works for the case when not all intermediate nodes are involved in the network coding. If some node simply forwards the incoming packets, then this can be incorporated in the following way. An erasure event on either the link entering this node or the link leaving this node will cause a packet erasure. Hence, these two links can be replaced by a single link whose probability of being ON is simply the product of the ON probabilities of the two links being replaced. Thus, all non-coding nodes can be removed from the model, which brings one back to the same situation as in the above model.

Queue update mechanism: Each node transmits a random linear combination of the current contents of its queue and hence, the question of how to update the queue contents becomes important. In every slot, the sink sends an ACK directly to the source, containing the index of the oldest packet not yet seen by the sink. Upon receiving the ACK, the source drops all packets from its queue with an index lower than the sink's request. The intermediate nodes do not have direct feedback from the sink. Hence, the source has to inform them about the sink's ACK. This information is sent on the same erasure channel used for the regular transmission. This feed-forward of the sink's status is modeled as follows. Whenever the channel entering an intermediate node is in the ON state (i.e., no erasure), the node's version of the sink's status is updated to that of the previous node. In practice, the source need not transmit the sink's status explicitly. The intermediate nodes can infer it from the set of packets that have been involved in the linear combination—if a packet is no longer involved, that means the source must have dropped it, implying that the sink must have ACKed it already. Whenever an intermediate node receives an innovative packet, this causes the node to see a previously unseen packet. The node performs a Gaussian elimination to compute the witness of the newly seen packet, and adds this to the queue. Thus, intermediate nodes store the witnesses of the packets that they have seen. The queue update rule is similar to that of the source. An intermediate node drops the witness of all packets up to but excluding the one requested by the sink. This is based on the most updated version of the sink's status known at the intermediate node.

Queuing analysis: The following theorem shows that if we allow coding at intermediate nodes, then it is possible to achieve the capacity of the network, namely $\min_i \mu_i$. Note that this theorem also implies that if forwarding is only allowed at some of the intermediate nodes, then the capacity of a new network can still be derived by collapsing the links across the non-coding nodes.

Theorem 2: As long as $\lambda < \mu_k$ for all $0 \leq k < N$, the queues at all the nodes will be stable. The expected queue size in steady state at node k ($0 \leq k < N$) is given by:

$$\mathbb{E}[Q_k] = \sum_{i=k}^{N-1} \frac{\rho_i(1-\mu_i)}{(1-\rho_i)} + \sum_{i=1}^{k-1} \rho_i$$

An implication: Consider a case where all the $p_i$s are equal to some p. Then, the above relation implies that in the limit of heavy traffic, $p \to 1$, the queues are expected to be longer at nodes near the source than near the sink.

A useful lemma: The following lemma shows that the random linear coding scheme has the property that every time there is a successful reception at a node, the node sees the next unseen packet with high probability, provided the field is large enough. This fact will prove useful while analyzing the evolution of the queues.

Lemma 1: Let $S_A$ and $S_B$ be the set of packets seen by two nodes A and B respectively. Assume $S_A \setminus S_B$ is non-empty. Suppose A sends a random linear combination of its witnesses of packets in $S_A$ and B receives it successfully. The probability that this transmission causes B to see the oldest packet in $S_A \setminus S_B$ is $$\left(1 - \frac{1}{q}\right),$$

where q is the field size.

Proof: Let $M_A$ be the RREF basis matrix for A. Then, the coefficient vector of the linear combination sent by A is $t = uM_A$ where u is a vector of length $|S_A|$ whose entries are independent and uniformly distributed over the finite field $\mathbb{FF}_q$. Let d* denote the index of the oldest packet in $S_A \setminus S_B$.

Let $M_B$ be the RREF basis matrix for B before the new reception. Suppose t is successfully received by B. Then, B will append t as a new row to $M_B$ and perform Gaussian elimination. The first step involves subtracting from t, suitably scaled versions of the pivot rows such that all entries of t corresponding to pivot columns of $M_B$ become 0. We need to find the probability that after this step, the leading non-zero entry occurs in column d*, which corresponds to the event that B sees packet d*. Subsequent steps in the Gaussian elimination will not affect this event. Hence, we focus on the first step.

Let $P_B$ denote the set of indices of pivot columns of $M_B$. In the first step, the entry in column d* of t becomes $$t'(d^*) = t(d^*) - \sum_{i \in P_B, i < d^*} t(i) \cdot M_B(r_B(i), d^*)$$

where $r_B(i)$ is the index of the pivot row corresponding to pivot column i in $M_B$. Now, due to the way RREF is defined, $$t(d^*) = u(r_A(d^*)),$$

where $r_A(i)$ denotes the index of the pivot row corresponding to pivot column i in $M_A$. Thus, $t(d^*)$ is uniformly distributed. Also, for $i < d^*$, $t(i)$ is a function of only those $u(j)$'s such that $j < r_A(d^*)$. Hence, $t(d^*)$ is independent of $t(d^*)$ for $i < d^*$. From these observations and the above expression for $t'(d^*)$, it follows that for any given $M_A$ and $M_B$, $t'(d^*)$ has a uniform distribution over $\mathbb{F}_q$, and the probability that it is not zero is therefore $$\left(1 - \frac{1}{q}\right).$$

For the queuing analysis, it is assumed that a successful reception always causes the receiver to see its next unseen packet, provided the transmitter has already seen it. A consequence of this assumption is that the set of packets seen by a node is always a contiguous set, with no gaps in between. In particular, there is no repeated ACK due to packets being seen out of order. The above lemma argues that these assumptions become more and more valid as the field size increases. In reality, some packets may be seen out of order resulting in larger queue sizes. However, this effect is minor and can be neglected for a first order analysis.

The expected queue size: arrival and departure are defined as follows. A packet is said to arrive at a node when the node sees the packet for the first time. A packet is said to depart from the node when the node drops the witness of that packet from its queue. For each intermediate node, we now study the expected time between the arrival and departure of an arbitrary packet at that node as this is related to the expected queue size at the node, by Little's law.

Proof Theorem 2: Consider the $k^{th}$ node, for $1 \leq k < N$. The time a packet spends in this node's queue has two parts:

1) Time until the packet is seen by the sink:

The difference between the number of packets seen by a node and the number of packets seen by the next node downstream essentially behaves like a Geom/Geom/1 queue. The Markov chain governing this evolution is identical to that of the virtual queues. Given that a node has seen the packet, the time it takes for the next node to see that packet corresponds to the waiting time in a virtual queue. For a load factor of p and a channel ON probability of μ the expected waiting time was derived to be $$\frac{(1-\mu)}{\mu(1-\rho)}.$$

Now, the expected time until the sees the packet is the sum of (N–k) such terms, which gives $$\sum_{i=k}^{N-1} \frac{(1-\mu_i)}{\mu_i(1-\rho_i)}.$$

2) Time until sink's ACK reaches intermediate node:

The ACK informs the source that the sink has seen the packet. This information needs to reach node k by the forward mechanism. The expected time for this information to move from node i to node i+1 is the expected time until the next slot when the channel is ON, which is just $$\frac{1}{\mu_i}$$

(since the $i^{th}$ channel is ON with probability $\mu_i$). Thus, the time it takes for the sink's ACK to reach node k is given by $$\sum_{i=k}^{k-1} \frac{1}{\mu_i}$$

The total expected time $T_k$ a packet spends in the queue at the $k^{th}$ node ($1 \leq k < N$) can thus be computed by adding the above two terms. Now, assuming the system is stable (i.e., $\lambda < \min_i \mu_i$), Little's law can be used to derive the expected queue size at the $k^{th}$ node, by multiplying $T_k$ by $\lambda$:

$$\mathbb{E}[Q_k] = \sum_{i=k}^{N-1} \frac{\rho_i(1-\mu_i)}{(1-\rho_i)} + \sum_{i=1}^{k-1} \rho_i$$

A salient feature of the present technique is that it is simultaneously compatible with the case where only end hosts perform coding (thereby preserving the end-to-end philosophy of TCP), as well as the case where intermediate nodes perform network coding. Theory suggests that a lot can be gained by allowing intermediate nodes to code as well. Simulations show that the proposed changes lead to large throughput gains over TCP in lossy links, even with coding only at the source. For instance, in a tandem network with a 5% loss rate on each link, the throughput goes up from about 0.007 Mbps to about 0.39 Mbps for the correct redundancy factor. Intermediate node coding further increases the gains.

Figure 9:
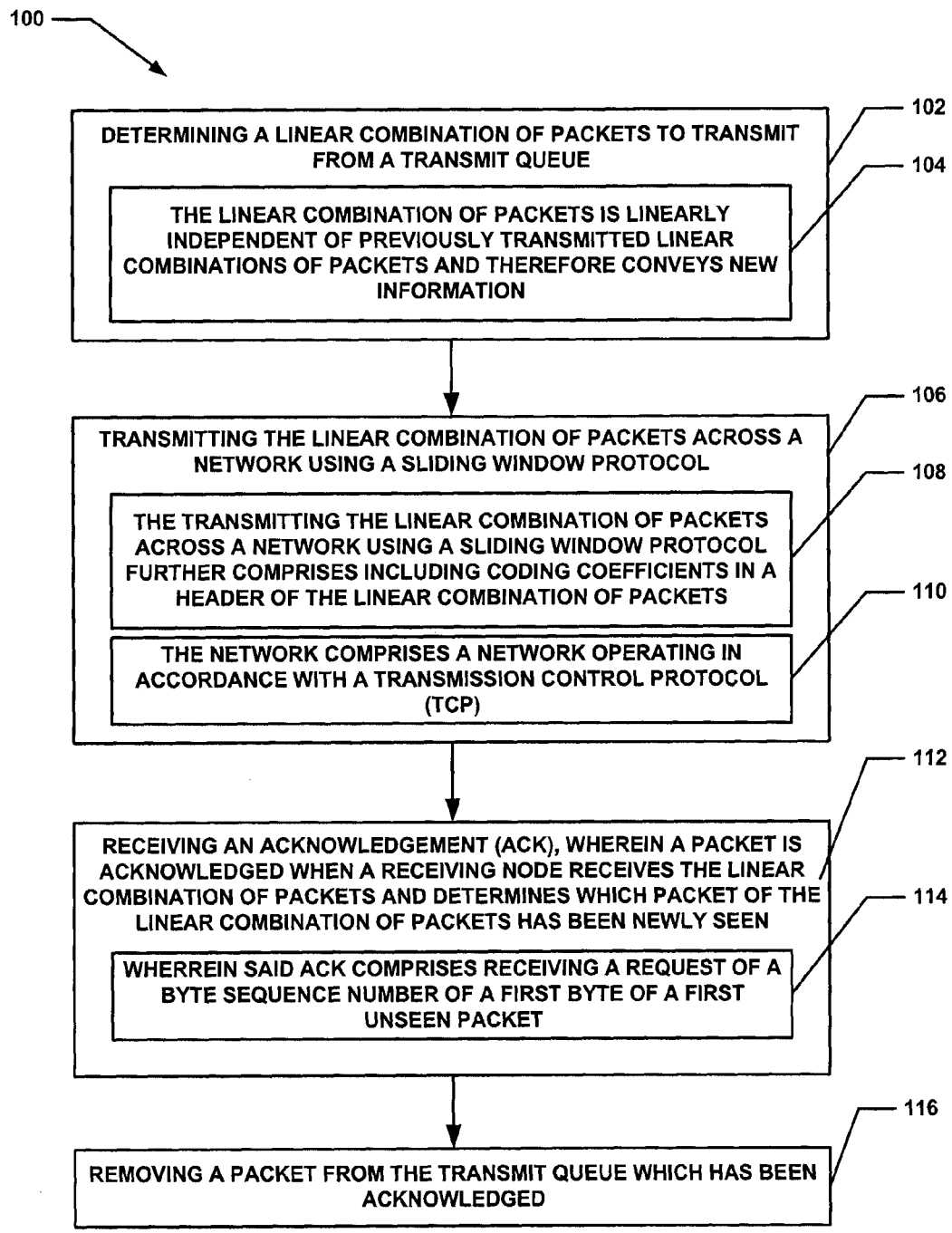
FIG. 9 illustrates a particular embodiment a method for a transmitting node to perform network coding based flow control in accordance with embodiments of the invention.
Figure 10:
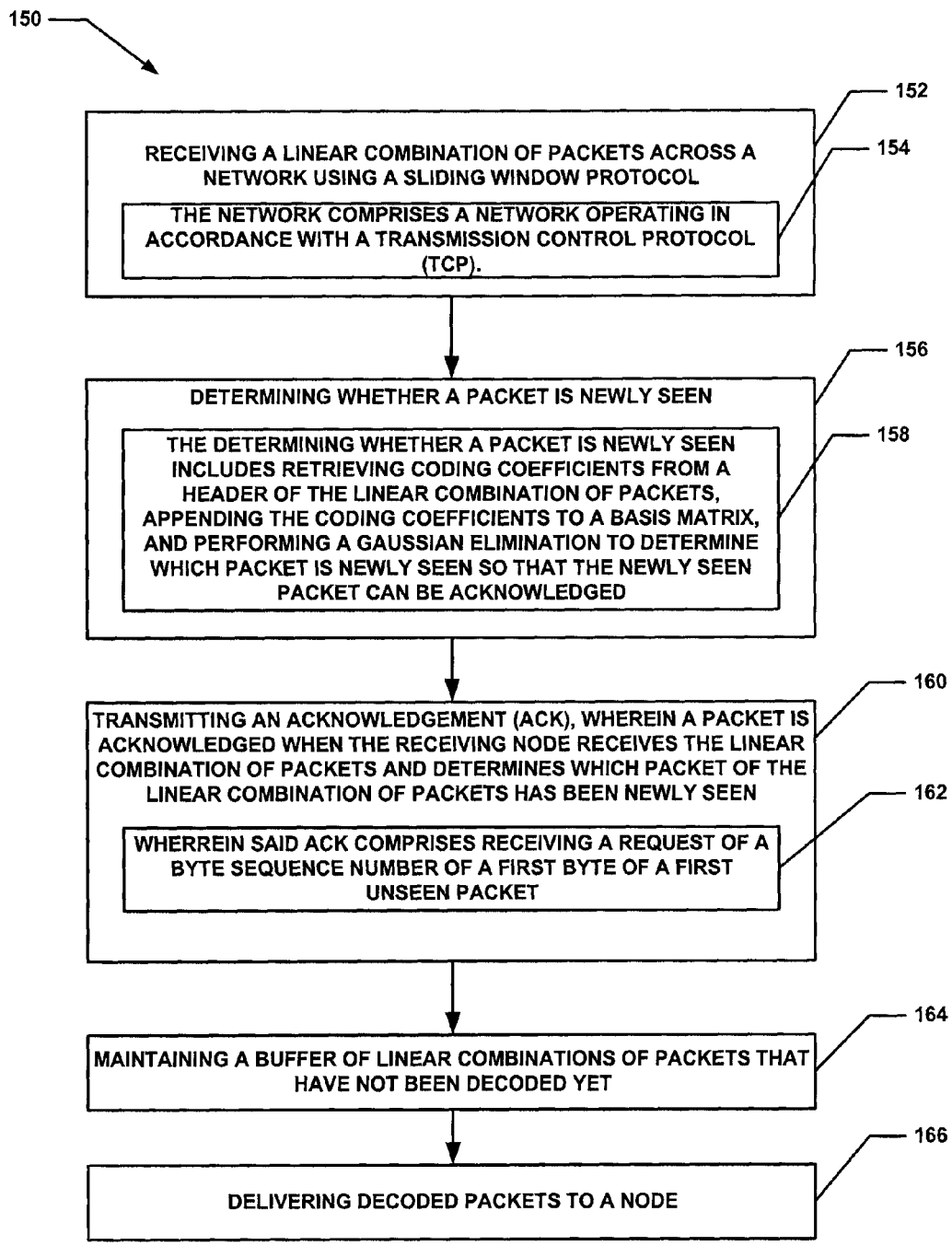
FIG. 10 illustrates a particular embodiment a method for a receiving node to perform network coding based flow control in accordance with embodiments of the invention.
Figure 11:
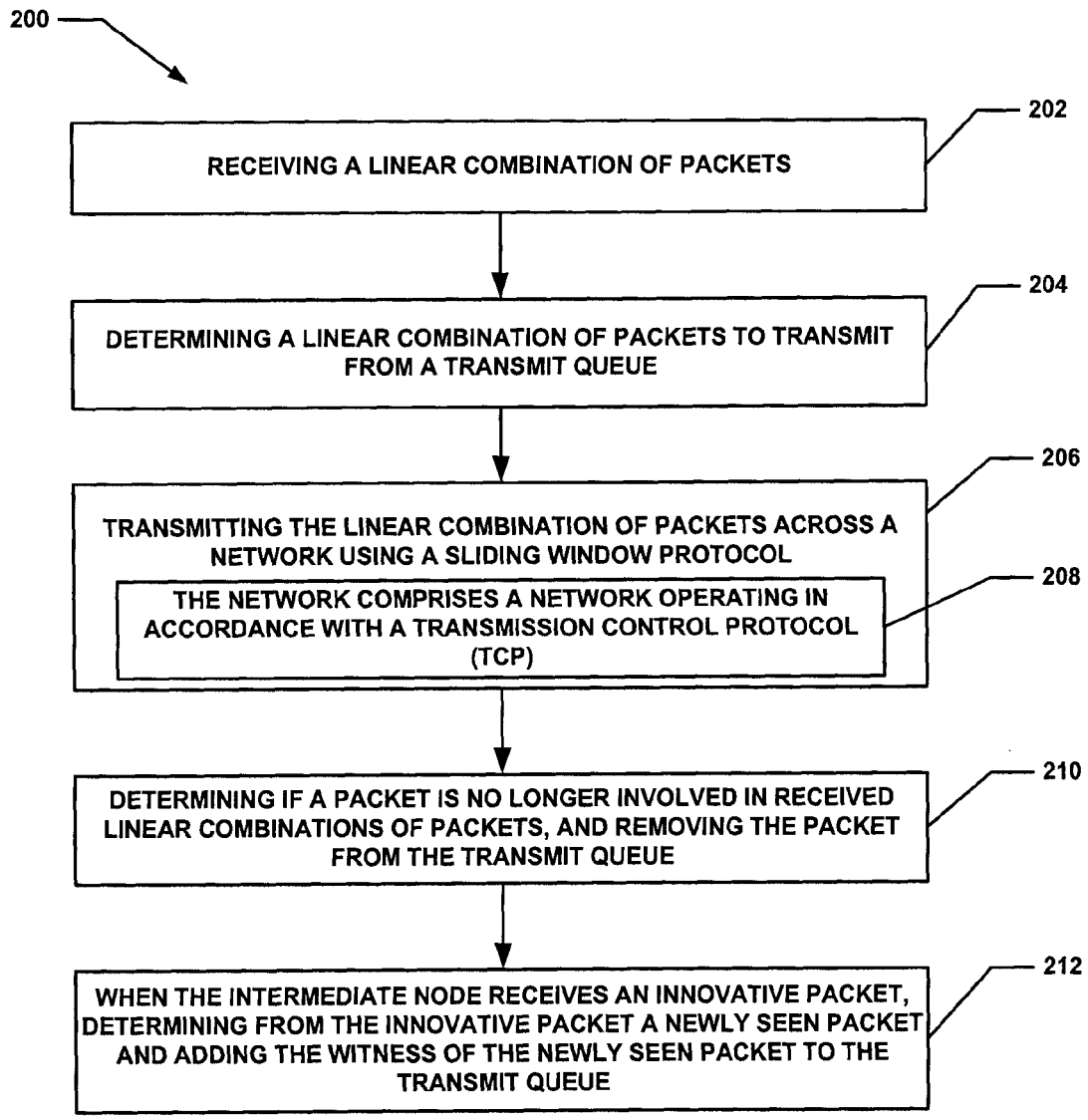
FIG. 11 illustrates a particular embodiment a method for an intermediate node to perform network coding based flow control in accordance with embodiments of the invention.

Flow diagrams of particular embodiments of the presently disclosed methods are depicted in FIGS. 9-11. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 9, a particular embodiment of a method 100 of providing network coding based flow control by way of a transmitting node is shown. Method 100 begins with processing block 102 which discloses determining a linear combination of packets to transmit from a transmit queue. As shown in processing block 104, the linear combination of packets is linearly independent of previously transmitted linear combinations of packets and therefore conveys new information.

Processing block 106 states transmitting the linear combination of packets across a network using a sliding window protocol. As further recited in processing block 108, the transmitting the linear combination of packets across a network using a sliding window protocol further comprises including coding coefficients in a header of the linear combination of packets. These coding coefficients are used in decoding the packet by the receiving node. Processing block 110 recites wherein the network comprises a network operating in accordance with a Transmission Control Protocol (TCP).

Processing block 112 discloses receiving an acknowledgement (ACK), wherein a packet is acknowledged when a receiving node receives the linear combination of packets and determines which packet of the linear combination of packets has been newly seen. As shown in processing block 114, and described in detail below, in a particular embodiment the receiving an ACK comprises receiving a request of a byte sequence number of a first byte of a first unseen packet. Processing block 116 states removing a packet from the transmit queue which has been acknowledged.

Referring now to FIG. 10, a particular embodiment of a method 150 of providing network coding based flow control by way of a receiving node is shown. Method 150 begins with processing block 152 which discloses receiving a linear combination of packets across a network using a sliding window protocol. As shown in processing block 154, the network comprises a network operating in accordance with a Transmission Control Protocol (TCP).

Processing block 156 states determining whether a packet is newly seen. As further recited in processing block 158, determining whether a packet is newly seen includes retrieving coding coefficients from a header of the linear combination of packets, appending the coding coefficients to a basis matrix, and performing a Gaussian elimination to determine which packet is newly seen so that the newly seen packet can be acknowledged.

Processing continues with processing block 160 which states transmitting an acknowledgement (ACK), wherein a packet is acknowledged when the receiving node receives the linear combination of packets and determines which packet of the linear combination of packets has been newly seen. As shown in processing block 162, and described in detail below, in a particular embodiment the receiving an ACK comprises receiving a request of a byte sequence number of a first byte of a first unseen packet.

Processing block 164 recites maintaining a buffer of linear combinations of packets that have not been decoded yet. Processing block 166 discloses delivering decoded packets to a node.

Referring now to FIG. 11, a particular embodiment of a method 200 of providing network coding based flow control by way of an intermediate node is shown. Method 200 begins with processing block 202 which discloses receiving a linear combination of packets. Processing block 204 states determining a linear combination of packets to transmit from a transmit queue.

Processing continues with processing block 206 which recites transmitting the linear combination of packets across a network using a sliding window protocol. As shown in processing block 208, the network comprises a network operating in accordance with a Transmission Control Protocol (TCP).

Processing block 210 discloses determining if a packet is no longer involved in received linear combinations of packets, and removing the packet from the transmit queue. Processing block 212 states when the intermediate node receives an innovative packet, determining from the innovative packet a newly seen packet and adding the newly seen packet to the transmit queue.

Described above is a new protocol called TCP/NC that incorporates network coding inside the TCP/IP protocol stack with the aim of improving TCP throughput in wireless networks. The interface of TCP with network coding can be viewed as a generalization of previous work combining TCP with Forward Erasure Correction (FEC) schemes. As opposed to coding only at the source, the protocol also allows intermediate nodes in the network to perform re-encoding of data. It is thus more general than end-to-end erasure correction over a single path, and can therefore, in principle, be used in multipath and multicast scenarios to obtain throughput benefits.

A real-life network coding implementation is now described, based on the mechanism proposed earlier. In particular, explained are:

1) How to address the practical problems that arise in making the network coding and decoding operations compatible with TCP's window management system, such as variable packet length, buffer management, and network coding overhead.

2) The compatibility of the present protocol with the widely used TCP Reno; the earlier methodology considered only TCP Vegas.

3) Experimental results on the throughput benefits of the new protocol for a TCP connection over a single-hop wireless link.

Before beginning, the implications of this new protocol for improving throughput in wireless networks are described. There has been a growing interest in approaches that make active use of the intrinsic broadcast nature of the wireless medium. In the technique known as opportunistic routing, a node broadcasts its packet, and if one of its neighbors receives the packet, that node will forward the packet downstream, thereby obtaining a diversity benefit. If more than one of the neighbors receives the packet, they will have to coordinate and decide who will forward the packet.

The MORE protocol proposed the use of intra-flow network coding in combination with opportunistic routing. The random linear mixing (coding) of incoming packets at a node before forwarding them downstream was shown to reduce the coordination overhead associated with opportunistic routing. Another advantage is that the coding operation can be easily tuned to add redundancy to the packet stream to combat erasures. Such schemes can potentially achieve capacity for a multicast connection.

Typical implementations use batches of packets instead of sliding windows, and are generally therefore not compatible with TCP. ExOR uses batching to reduce the coordination overhead, but this interacts badly with TCP's window mechanism. MORE uses batching to perform the coding operation. In this case, the receiver cannot acknowledge the packets until an entire batch has arrived and has been successfully decoded. Since TCP performance heavily relies on the timely return of ACKs, such a delay in the ACKs would affect the round-trip time calculation and thereby reduce the throughput.

Opportunistic routing also leads to reordering of packets, which is known to interact badly with TCP, as reordering can cause duplicate ACKs, and TCP interprets duplicate ACKs as a sign of congestion. The earlier described technique proposes a TCP-compatible sliding window coding scheme in combination with a new acknowledgment mechanism for running TCP over a network coded system. The sender would transmit a random linear combination of packets in the TCP congestion window. The new type of ACK allows the receiver to acknowledge every linear combination (degree of freedom) that is linearly independent from the previously received linear combinations. The receiver does not have to wait to decode a packet, but can send a TCP ACK for every degree of freedom received, thus eliminating the problems of using batchwise ACKs.

It was shown that if the linear combination happens over a large enough finite field, then every incoming random linear combination will, with high probability, generate a TCP ACK for the very next unacknowledged packet in order. This is because the random combinations do not have any inherent ordering. The argument holds true even when multiple paths deliver the random linear combinations. Hence the use of random linear coding with the acknowledgment of degrees of freedom can potentially address the TCP reordering problem for multipath opportunistic routing schemes. By presenting an implementation of the TCP/NC protocol, this work provides a way of combining TCP with network-coding-based multipath opportunistic routing protocols such as MORE.

The above description of the protocol assumes a fixed packet length, which allows all coding and decoding operations to be performed symbol-wise on the whole packet. That is, an entire packet serves as the basic unit of data (i.e., as a single unknown), with the implicit understanding that the exact same operation is being performed on every symbol within the packet. The main advantage of this view is that the decoding matrix operations (i.e., Gaussian elimination) can be performed at the granularity of packets instead of individual symbols. Also, the ACKs are then able to be represented in terms of packet numbers. Finally, the coding vectors then have one coefficient for every packet, not every symbol. Note that the same protocol and analysis holds even if the basic unit of data is fixed as a symbol instead of a packet. The problem is that the complexity will be very high as the size of the coding matrix will be related to the number of symbols in the coding buffer, which is much more than the number of packets (typically, a symbol is one byte long).

In actual practice, TCP is a byte-stream oriented protocol in which ACKs are in terms of byte sequence numbers. If all packets are of fixed length, one can still apply the packet-level approach, since there is a clear and consistent map between packet sequence numbers and byte sequence numbers. In reality, however, TCP might generate segments of different sizes. The choice of how many bytes to group into a segment is usually made based on the Maximum Transmission Unit (MTU) of the network, which could vary with time. A more common occurrence is that applications may use the PUSH flag option asking TCP to packetize the currently outstanding bytes into a segment, even if it does not form a segment of the maximum allowed size. In short, it is important to ensure that the protocol works correctly in spite of variable packet sizes.

A closely related problem is that of repacketization, which refers to the situation where a set of bytes that were assigned to two different segments earlier by TCP may later be reassigned to the same segment during retransmission. As a result, the grouping of bytes into packets under TCP may not be fixed over time.

Both variable packet lengths and repacketization need to be addressed when implementing the coding protocol. To solve the first problem, if there are packets of different lengths, one could elongate the shorter packets by appending sufficiently many dummy zero symbols until all packets have the same length. This will work correctly as long as the receiver is somehow informed how many zeros were appended to each packet. While transmitting these extra dummy symbols will decrease the throughput, generally this loss will not be significant, as packet lengths are usually consistent.

However, if there is repacketization, then there is another problem, namely it is no longer possible to view a packet as a single unknown. This is because one would not have a one-to-one mapping between packets sequence numbers and byte sequence numbers; the same bytes may now occur in more than one packet. Repacketization appears to destroy the convenience of performing coding and decoding at the packet level.

To counter these problems, the following solution is proposed. The coding operation involves the sender storing the packets generated by the TCP source in a coding buffer. Any incoming TCP segment is pre-processed before adding it to the coding buffer as follows:

1) First, any part of the incoming segment that is already in the buffer is removed from the segment.

2) Next, a separate TCP packet is created out of each remaining contiguous part of the segment.

3) The source and destination port information is removed. It will be added later in the network coding header.

4) The packets are appended with sufficiently many dummy zero bytes, to make them as long as the longest packet currently in the buffer. Every resulting packet is then added to the buffer. This processing ensures that the packets in the buffer will correspond to disjoint and contiguous sets of bytes from the byte stream, thereby restoring the one-to-one correspondence between the packet numbers and the byte sequence numbers. The reason the port information is excluded from the coding is because port information is necessary for the receiver to identify which TCP connection a coded packet corresponds to. Hence, the port information should not be involved in the coding. The remaining parts of the header are referred to as the TCP subheader.

Figure 12:
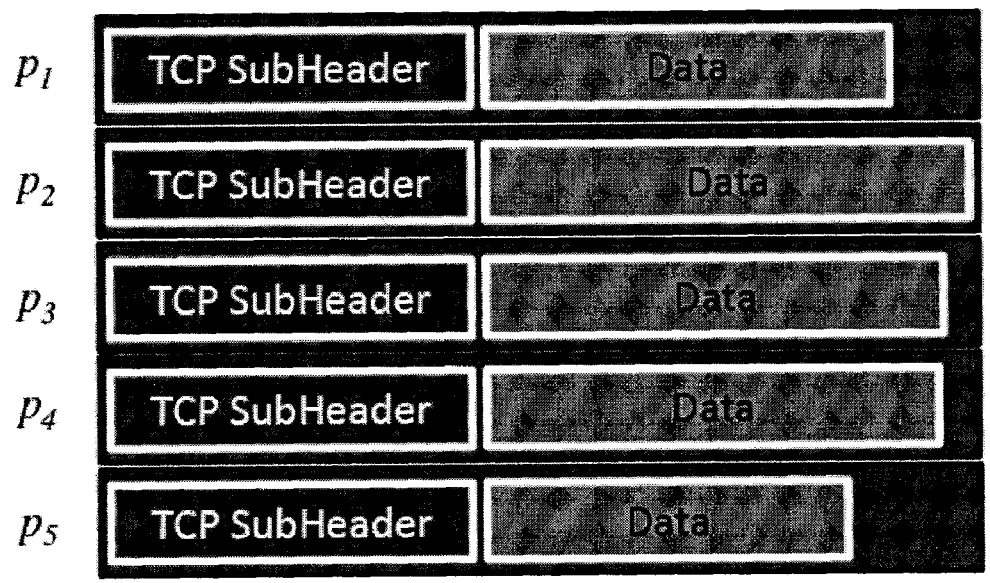
FIG. 12 illustrates a high level block diagram of a coding buffer in accordance with embodiments of the invention.

Upon decoding the packet, the receiver can find out how many bytes are real and how many are dummy using the $Start_i$ and $End_i$ header fields in the network coding header (described below). With these fixes in place, the packet-level algorithm is ready to be used. All operations are performed on the packets in the coding buffer. FIG. 12 shows a typical state of the buffer after this pre-processing. The gaps at the end of the packets correspond to the appended zeros. It is important to note that the TCP control packets such as SYN packet and reset packet are allowed to bypass the coding buffer and are directly delivered to the receiver without any coding.

A coded packet is created by forming a random linear combination of a subset of the packets in the coding buffer. The coding operations are done over a field of size 256 in this implementation. In this case, a field symbol corresponds to one byte. The header of a coded packet should contain information that the receiver can use to identify what is the linear combination corresponding to the packet. The header structure will now be discussed in more detail.

Figure 13:
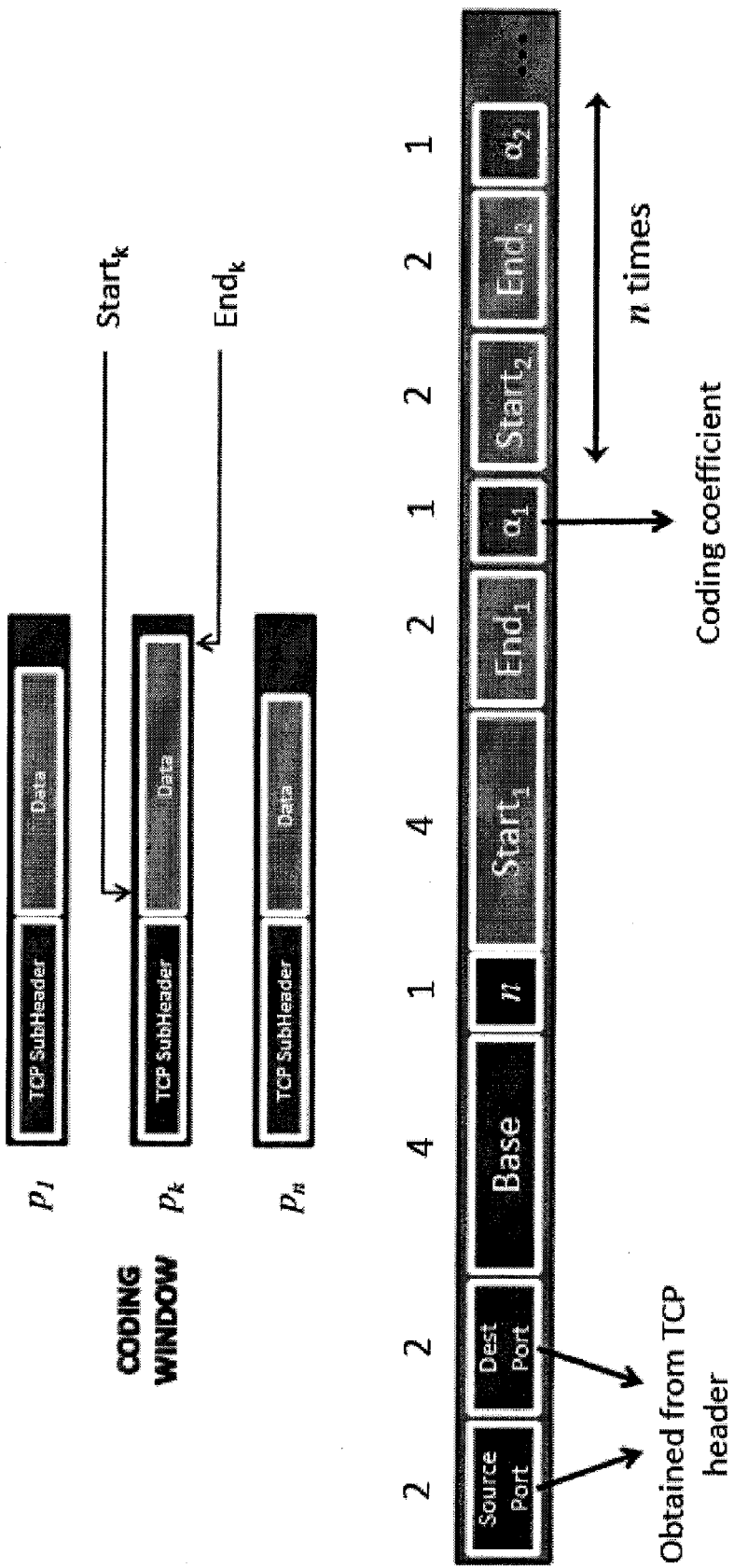
FIG. 13 is a diagram of a network coding header in accordance with embodiments of the invention.

The network coding header has the structure shown in FIG. 13. The typical sizes (in bytes) of the various fields are written above them. The meaning of the various fields are described next:

Source and destination port: The port information is needed for the receiver to identify the coded packet's session. It must not be included in the coding operation. It is taken out of the TCP header and included in the network coding header.

Base: The TCP byte sequence number of the first byte that has not been ACKed. The field is used by intermediate nodes or the decoder to decide which packets can be safely dropped from their buffers without affecting reliability.

n: The number of packets involved in the linear combination.

$Start_i$: The starting byte of the ith packet involved in the linear combination.

$End_i$: The last byte of the ith packet involved in the linear combination.

αi: The coefficient used for the ith packet involved in the linear combination.

The $Start_i$ (except $Start_1$) and $End_i$ are expressed relative to the previous packet's End and Start respectively, to save header space. As shown in FIG. 12, this header format will add 5n+7 bytes of overhead for the network coding header in addition to the TCP header, where n is the number of packets involved in a linear combination. (Note that the port information is not counted in this overhead, since it has been removed from the TCP header.) It may be possible to reduce this overhead by further optimizing the header structure.

In the theoretical version of the algorithm, the sender transmits a random linear combination of all packets in the coding buffer. However, as noted above, the size of the header scales with the number of packets involved in the linear combination. Therefore, mixing all packets currently in the buffer will lead to a very large coding header.

To solve this problem, only a constant-sized subset of the packets chosen from within the coding buffer are mixed. We call this subset the coding window. The coding window evolves as follows. The algorithm uses a fixed parameter for the maximum coding window size W. The coding window contains the packet that arrived most recently from TCP (which could be a retransmission), and the (W−1) packets before it in sequence number, if possible. However, if some of the (W−1) preceding packets have already been dropped, then the window is allowed to extend beyond the most recently arrived packet until it includes W packets.

Note that this limit on the coding window implies that the code is now restricted in its power to correct erasures and to combat reordering-related issues. The choice of W will thus play an important role in the performance of the scheme. The correct value for W will depend on the length of burst errors that the channel is expected to produce. Other factors to be considered while choosing W are discussed below.

A packet is removed from the coding buffer if a TCP ACK has arrived requesting a byte beyond the last byte of that packet. If a new TCP segment arrives when the coding buffer is full, then the segment with the newest set of bytes must be dropped. This may not always be the newly arrived segment, for instance, in the case of a TCP retransmission of a previously dropped segment.

The decoder module's operations are outlined below. The main data structure involved is the decoding matrix, which stores the coefficient vectors corresponding to the linear combinations currently in the decoding buffer.

The receiver side module stores the incoming linear combination in the decoding buffer. Then it unwraps the coding header and appends the new coefficient vector to the decoding matrix. Gaussian elimination is performed and the packet is dropped if it is not innovative (i.e. if it is not linearly independent of previously received linear combinations). After Gaussian elimination, the oldest unseen packet is identified. Instead of acknowledging the packet number a, the decoder acknowledges the last seen packet by requesting the byte sequence number of the first byte of the first unseen packet, using a regular TCP ACK. Note that this could happen before the packet is decoded and delivered to the receiver TCP. The port and IP address information for sending this ACK may be obtained from the SYN packet at the beginning of the connection. Any ACKs generated by the receiver TCP are not sent to the sender. They are instead used to update the receive window field that is used in the TCP ACKs generated by the decoder (see subsection below). They are also used to keep track of which bytes have been delivered, for buffer management.

The Gaussian elimination operations are performed not only on the decoding coefficient matrix, but correspondingly also on the coded packets themselves. When a new packet is decoded, any dummy zero symbols that were added by the encoder are pruned using the coding header information. A new TCP packet is created with the newly decoded data and the appropriate TCP header fields and this is then delivered to the receiver TCP.

The decoding buffer needs to store packets that have not yet been decoded and delivered to the TCP receiver. Delivery can be confirmed using the receiver TCP's ACKs. In addition, the buffer also needs to store those packets that have been delivered but have not yet been dropped by the encoder from the coding buffer. This is because, such packets may still be involved in incoming linear combinations. The Base field in the coding header addresses this issue. Base is the oldest byte in the coding buffer. Therefore, the decoder can drop a packet if its last byte is smaller than Base, and in addition, has been delivered to and ACKed by the receiver TCP. Whenever a new linear combination arrives, the value of Base is updated from the header, and any packets that can be dropped are dropped.

Figure 14:
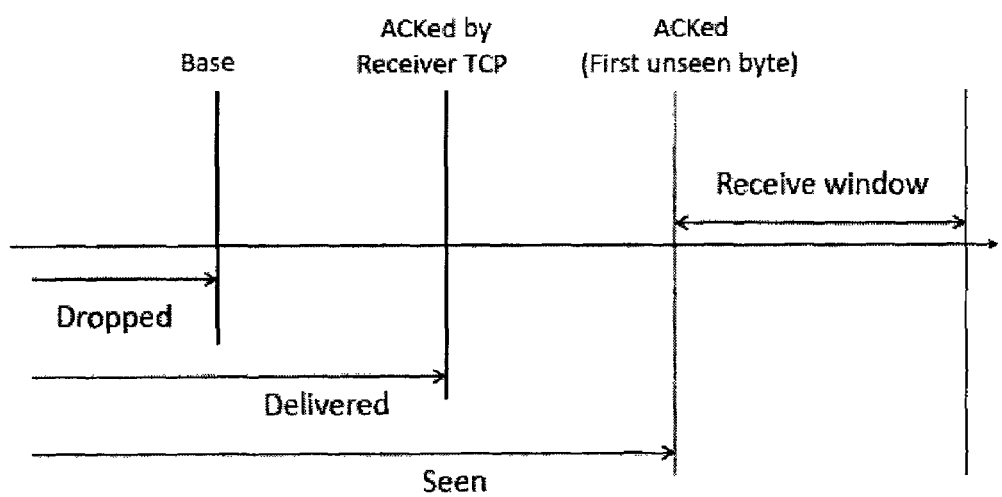
FIG. 14 is a diagram showing receiver side window management in accordance with embodiments of the invention.

The buffer management can be understood using FIG. 14. It shows the receiver side windows in a typical situation. In this case, Base is less than the last delivered byte. Hence, some delivered packets have not yet been dropped. There could also be a case where Base is beyond the last delivered byte, possibly because nothing has been decoded in a while.

The TCP receive window header field is used by the receiver to inform the sender how many bytes it can accept. Since the receiver TCP's ACKs are suppressed, the decoder must copy this information in the ACKs that it sends to the sender. However, to ensure correctness, the value of the TCP receive window is modified based on the decoding buffer size. The last acceptable byte should thus be the minimum of the receiver TCP's last acceptable byte and the last byte that the decoding buffer can accommodate. Note that while calculating the space left in the decoding buffer, the space occupied by data that has already been delivered to the receiver is included because such data will get dropped when Base is updated. If window scaling option is used by TCP, this needs to be noted from the SYN packet, so that the modified value of the receive window can be correctly reported. Ideally, a large enough decoding buffer size is chosen so that the decoding buffer would not be the bottleneck and this modification would never be needed.

The choice of redundancy factor is based on the effective loss probability on the links. For a loss rate of $p_e$, with an infinite window W and using TCP Vegas, the theoretically optimal value of R is $1/(1-p_e)$. The basic idea is that of the coded packets that are sent into the network, only a fraction $(1-p_e)$ of them are delivered on average. Hence, the value of R must be chosen so that in spite of these losses, the receiver is able to collect linear equations at the same rate as the rate at which the unknown packets are mixed in them by the encoder. As discussed below, in practice, the value of R may depend on the coding window size W. As W decreases, the erasure correction capability of the code goes down. Hence, we may need a larger R to compensate and ensure that the losses are still masked from TCP. Another factor that affects the choice of R is the use of TCP Reno. The TCP Reno mechanism causes the transmission rate to fluctuate around the link capacity, and this leads to some additional losses over and above the link losses. Therefore, the optimal choice of R may be higher than $1/(1-p_e)$.

There are several considerations to keep in mind while choosing W, the coding window size. The main idea behind coding is to mask the losses on the channel from TCP. In other words, it is desirable to correct losses without relying on the ACKs. Consider a case where W is just 1. Then, this is a simple repetition code. Every packet is repeated R times on average. Now, such a repetition would be useful only for recovering one packet, if it was lost. Instead, if W was say 3, then every linear combination would be useful to recover any of the three packets involved. Ideally, the linear combinations generated should be able to correct the loss of any of the packets that have not yet been ACKed. For this, W needs to be large. This may be difficult, since a large W would lead to a large coding header. Another penalty of choosing a large value of W is related to the interaction with TCP Reno. This is discussed below.

The penalty of keeping W small on the other hand, is that it reduces the error correction capability of the code. For a loss probability of 10%, the theoretical value of R is around 1.1. However, this assumes that all linear combinations are useful to correct any packet's loss. The restriction on W means that a coded packet can be used only for recovering those W packets that have been mixed to form that coded packet. In particular, if there is a contiguous burst of losses that result in a situation where the receiver has received no linear combination involving a particular original packet, then that packet will show up as a loss to TCP. This could happen even if the value of R is chosen according to the theoretical value. To compensate, a larger R is chosen.

The connection between W, R and the losses that are visible to TCP can be visualized as follows. Imagine a process in which whenever the receiver receives an innovative linear combination, one imaginary token is generated, and whenever the sender slides the coding window forward by one packet, one token is used up. If the sender slides the coding window forward when there are no tokens left, then this leads to a packet loss that will be visible to TCP. The reason is, when this happens, the decoder will not be able to see the very next unseen packet in order. Instead, it will skip one packet in the sequence. This will make the decoder generate duplicate ACKs requesting that lost (i.e., unseen) packet, thereby causing the sender to notice the loss.

In this process, W corresponds to the initial number of tokens available at the sender. Thus, when the difference between the number of redundant packets (linear equations) received and the number of original packets (unknowns) involved in the coding up to that point is less than W, the losses will be masked from TCP. However, if this difference exceeds W, the losses will no longer be masked. A theoretically optimal value of W is not known. However, it is expected that the value should be a function of the loss probability of the link. For the experiment, values of W were chosen based on trial and error.

By adding enough redundancy, the coding operation essentially converts the lossiness of the channel into an extension of the round-trip time (RTT). This is why the earlier described technique proposed the use of the idea with TCP Vegas, since TCP Vegas controls the congestion window in a smoother manner using RTT, compared to the more abrupt loss-based variations of TCP Reno. However, the coding mechanism is also compatible with TCP Reno. The choice of W plays an important role in ensuring this compatibility. The choice of W controls the power of the underlying code, and hence determines when losses are visible to TCP. Losses will be masked from TCP as long as the number of received equations is no more than W short of the number of unknowns involved in them. For compatibility with Reno, one needs to make sure that whenever the sending rate exceeds the link capacity, the resulting queue drops are visible to TCP as losses. A very large value of W is likely to mask even these congestion losses, thereby temporarily giving TCP a false estimate of capacity. This will eventually lead to a timeout, and will affect throughput. The value of W should therefore be large enough to mask the link losses and small enough to allow TCP to see the queue drops due to congestion.

It is important to implement the encoding and decoding operations efficiently, since any time spent in these operations will affect the round-trip time perceived by TCP. The finite field operations over GF(256) have been optimized through the use of logarithms to multiply elements. Over GF(256), each symbol is one byte long. Addition in GF(256) can be implemented easily as a bitwise XOR of the two bytes.

The main computational overhead on the encoder side is the formation of the random linear combinations of the buffered packets. The management of the buffer also requires some computation, but this is small compared to the random linear coding, since the coding has to be done on every byte of the packets. Typically, packets have a length L of around 1500 bytes. For every linear combination that is created, the coding operation involves LW multiplications and L(W−1) additions over GF(256), where W is the coding window size. Note that this has to be done R times on average for every packet generated by TCP. Since the coded packets are newly created, allocating memory for them could also take time.

On the decoder side, the main operation is the Gaussian elimination. Note that, to identify whether an incoming linear combination is innovative or not, we need to perform Gaussian elimination only on the decoding matrix, and not on the coded packet. If it is innovative, then we perform the row transformation operations of Gaussian elimination on the coded packet as well. This requires O(LW) multiplications and additions to zero out the pivot columns in the newly added row. The complexity of the next step of zeroing out the newly formed pivot column in the existing rows of the decoding matrix vary depending on the current size and structure of the matrix. Upon decoding a new packet, it needs to be packaged as a TCP packet and delivered to the receiver. Since this requires allocating space for a new packet, this could also be expensive in terms of time.

As we will see in the next section, the benefits brought by the erasure correction begin to outweigh the overhead of the computation and coding header for loss rates of about three percent. This could be improved further by more efficient implementation of the encoding and decoding operations.

The TCP/NC protocol requires no modification in the basic features of the TCP protocol on either the sender side or the receiver side. However, other special features of TCP that make use of the ACKs in ways other than to report the next required byte sequence number, will need to be handled carefully. For instance, implementing the timestamp option in the presence of network coding across packets may require some thought. With TCP/NC, the receiver may send an ACK for a packet even before it is decoded. Thus, the receiver may not have access to the timestamp of the packet when it sends the ACK. Similarly, the TCP checksum field has to be dealt with carefully. Since a TCP packet is ACKed even before it is decoded, its checksum cannot be tested before ACKing. One solution is to implement a separate checksum at the network coding layer to detect errors. In the same way, the various other TCP options that are available have to be implemented with care to ensure that they are not affected by the premature ACKs.

Figure 15:
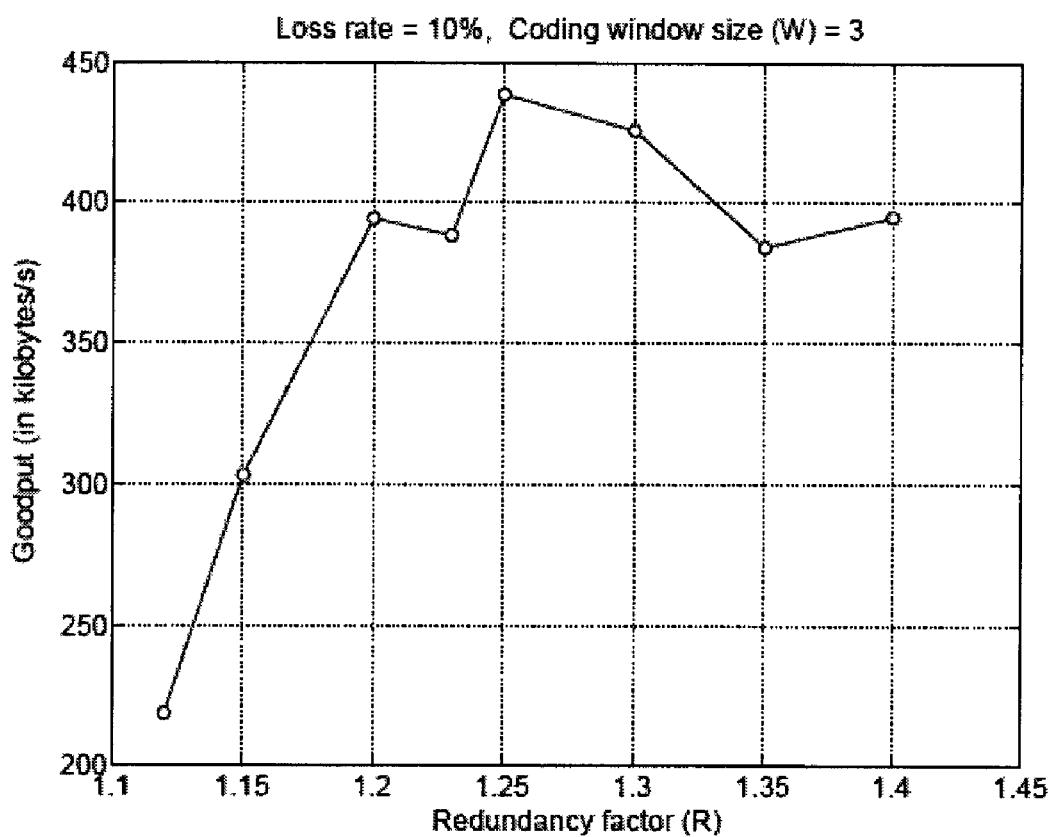
FIG. 15 is a graph showing goodput versus redundancy factor in accordance with embodiments of the invention.
Figure 16:
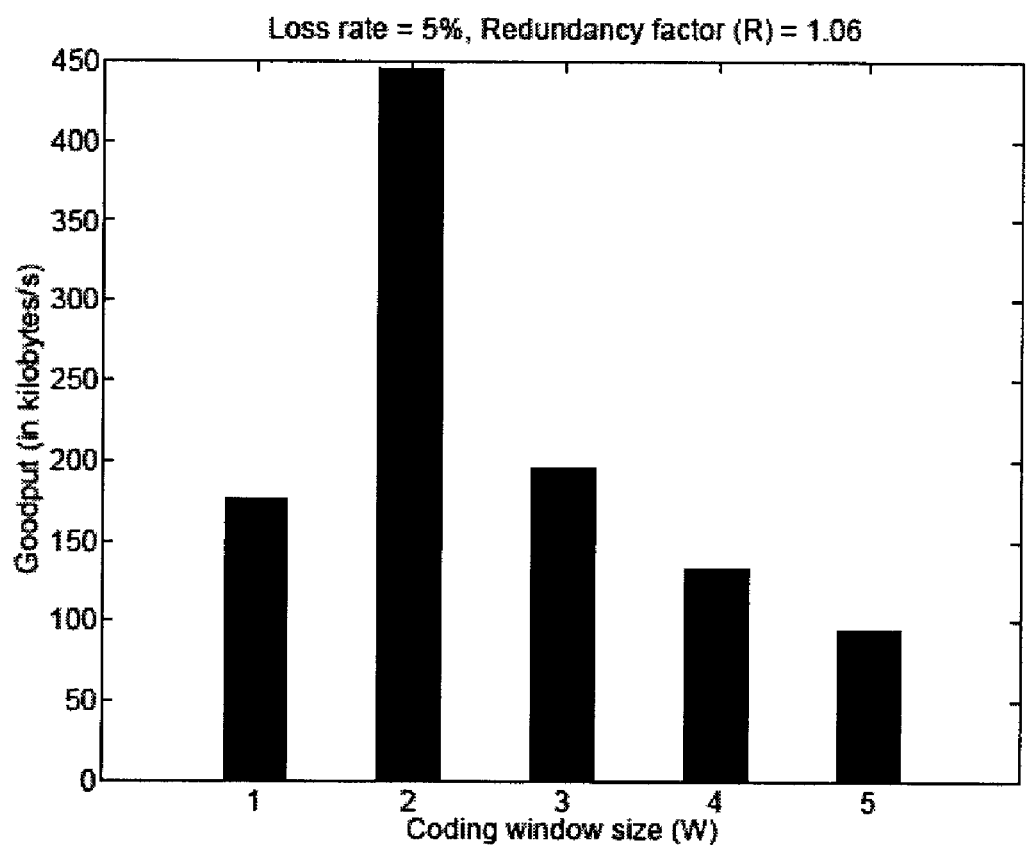
FIG. 16 is a graph showing goodput versus coding window size in accordance with embodiments of the invention.
Figure 17:
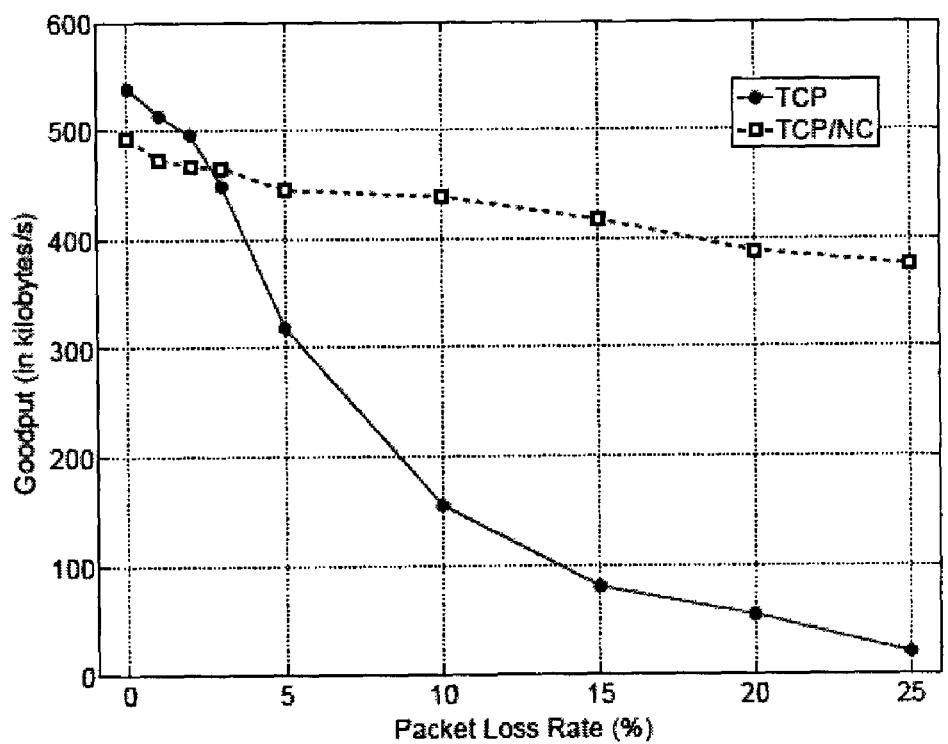
FIG. 17 is a graph showing goodput versus packet loss rate in accordance with embodiments of the invention.

The protocol was tested on a TCP flow running over a single-hop wireless link. The transmitter and receiver are Linux machines equipped with a wireless antenna. The experiment is performed over 802.11a with a bit-rate of 6 Mbps and a maximum of 5 link layer retransmission attempts. RTS-CTS is disabled. The present implementation uses the Click modular router. In order to control the parameters of the setup, the predefined elements of Click are used. Since the two machines are physically close to each other, there are very few losses on the wireless link. Instead, packet losses were artificially induced using the RandomSample element. Note that these packet losses are introduced before the wireless link. Hence, they will not be recovered by the link layer retransmissions, and have to be corrected by the layer above IP. The round-trip delay is empirically observed to be in the range of a few tens of milliseconds. The encoder and decoder queue sizes are set to 100 packets, and the size of the bottleneck queue just in front of the wireless link is set to 5 packets. In the setup, the loss inducing element is placed before the bottleneck queue. The quantity measured during the experiment is the goodput over a 20 second long TCP session. The goodput is measured using iper f. Each point in the plots shown is averaged over 4 or more iterations of such sessions, depending on the variability. Occasionally, when the iteration does not terminate and the connection times out, the corresponding iteration is neglected in the average, for both TCP and TCP/NC. This happens around 2% of the time, and is observed to be because of an unusually long burst of losses in the forward or return path. In the comparison, neither TCP nor TCP/NC uses selective ACKs. TCP uses delayed ACKs. However, we have not implemented delayed ACKs in TCP/NC at this point. FIGS. 15-17 are base don real experiments. FIG. 15 shows the variation of the goodput with the redundancy factor R for a loss rate of 10%, with a fixed coding window size of W=3. The theoretically optimal value of R for this loss rate is 1.11 (=1/0.9). However, from the experiment, the best goodput is achieved for an R of around 1.25. The discrepancy is possibly because of the type of coding scheme employed. The coding scheme transmits a linear combination of only the W most recent arrivals, in order to save packet header space. This restriction reduces the strength of the code for the same value of R. In general, the value of R and W must be carefully chosen to get the best benefit of the coding operation. As mentioned earlier, another reason for the discrepancy could be the use of TCP Reno.

FIG. 16 plots the variation of goodput with the size of the coding window size W. The loss rate for this plot is 5%, with the redundancy factor fixed at 1.06. We see that the best coding window size is 2. Note that a coding window size of W=1 corresponds to a repetition code that simply transmits every packet 1.06 times on average. In comparison, a simple sliding window code with W=2 brings a big gain in throughput by making the added redundancy more useful. However, going beyond 2 reduces the goodput because a large value of W can mislead TCP into believing that the capacity is larger than it really is, which leads to timeouts. The best value of W for this setup is usually 2 for a loss rate up to around 5%, and is 3 for higher loss rates up to 25%. Besides the loss rate, the value of W could also depend on other factors such as the round-trip time of the path.

FIG. 17 shows the goodput as a function of the packet loss rate. For each loss rate, the values of R and W have been chosen by trial and error, to be the one that maximizes the goodput. We see that in the lossless case, TCP performs better than TCP/NC. This could be because of the computational overhead that is introduced by the coding and decoding operations, and also the coding header overhead. However, as the loss rate increases, the benefits of coding begin to outweigh the overhead. The goodput of TCP/NC is therefore higher than TCP. Coding allows losses to be masked from TCP, and hence the fall in goodput is more gradual with coding than without. The performance can be improved further by improving the efficiency of the computation.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a transmitting node performs operations comprising:
   determining a linear combination of packets to transmit from a transmit queue;
   transmitting said linear combination of packets across a network using a sliding window protocol; and
   receiving an acknowledgement (ACK), wherein a packet is acknowledged when a receiving node receives the linear combination of packets and determines which packet of said linear combination of packets has been newly seen, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged.

2. The method of claim 1 further comprising removing a packet from said transmit queue which has been acknowledged.

3. The method of claim 1 wherein said network comprises a network operating in accordance with a Transmission Control Protocol (TCP).

4. The method of claim 1 wherein said transmitting said linear combination of packets across a network using a sliding window protocol further comprises including coding coefficients in a header of said linear combination of packets.

5. The method of claim 1 wherein said linear combination of packets is linearly independent of previously transmitted linear combinations of packets and therefore conveys new information.

6. The method of claim 1 wherein said ACK comprises receiving a request of a byte sequence number of a first byte of a first unseen packet.

7. A computer-implemented method in which a receiving node performs operations comprising:
   receiving a linear combination of packets across a network using a sliding window protocol;
   determining whether a packet is newly seen, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged; and
   transmitting an acknowledgement (ACK), wherein a packet is acknowledged when the receiving node receives the linear combination of packets and determines which packet of said linear combination of packets has been newly seen.

8. The method of claim 7 wherein said network comprises a network operating in accordance with a Transmission Control Protocol (TCP).

9. The method of claim 7 further comprising maintaining a buffer of linear combinations of packets that have not been decoded yet.

10. The method of claim 7 further comprising delivering decoded packets to a node.

11. The method of claim 7 wherein said ACK comprises receiving a request of a byte sequence number of a first byte of a first unseen packet.

12. A computer-implemented method in which an intermediate node performs operations comprising:
    receiving a linear combination of packets;
    determining a linear combination of packets to transmit from a transmit queue;
    transmitting said linear combination of packets across a network using a sliding window protocol; and
    when said intermediate node receives an innovative packet, determining from said innovative packet a newly seen packet and adding the witness of the newly seen packet to said transmit queue, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged.

13. The method of claim 12 further comprising determining if a packet is no longer involved in received linear combinations of packets, and removing said packet from said transmit queue.

14. The method of claim 12 wherein said network comprises a network operating in accordance with a Transmission Control Protocol (TCP).

15. A non-transitory computer readable storage medium having computer readable code thereon for providing network coding based flow control, the medium including instructions in which a transmitting node performs operations comprising:
    determining a linear combination of packets to transmit from a transmit queue;
    transmitting said linear combination of packets across a network using a sliding window protocol; and
    receiving an acknowledgement (ACK), wherein a packet is acknowledged when a receiving node receives the linear combination of packets and determines which packet of said linear combination of packets has been newly seen, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged.

16. The computer readable storage medium of claim 15 further comprising removing a packet from said transmit queue which has been acknowledged.

17. The computer readable storage medium of claim 15 wherein said network comprises a network operating in accordance with a Transmission Control Protocol (TCP).

18. The computer readable storage medium of claim 15 wherein said transmitting said linear combination of packets across a network using a sliding window protocol further comprises including coding coefficients in a header of said linear combination of packets.

19. The computer readable storage medium of claim 14 wherein said linear combination of packets is linearly independent of previously transmitted linear combinations of packets and therefore conveys new information.

20. The computer readable storage medium of claim 14 wherein said ACK comprises receiving a request of a byte sequence number of a first byte of a first unseen packet.

21. A non-transitory computer readable storage medium having computer readable code thereon for providing network coding based flow control, the medium including instructions in which a receiving node performs operations comprising:
receiving a linear combination of packets across a network using a sliding window protocol;
determining whether a packet is newly seen, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged; and
transmitting an acknowledgement (ACK), wherein a packet is acknowledged when the receiving node receives the linear combination of packets and determines which packet of said linear combination of packets has been newly seen.

22. The computer readable storage medium of claim 21 wherein said network comprises a network operating in accordance with a Transmission Control Protocol (TCP).

23. The computer readable storage medium of claim 21 further comprising maintaining a buffer of linear combinations of packets that have not been decoded yet.

24. The computer readable storage medium of claim 21 further comprising delivering decoded packets to a node.

25. The computer readable storage medium of claim 21 wherein said ACK comprises receiving a request of a byte sequence number of a first byte of a first unseen packet.

26. A non-transitory computer readable storage medium having computer readable code thereon for providing network coding based flow control, the medium including instructions in which an intermediate node performs operations comprising:
receiving a linear combination of packets;
determining a linear combination of packets to transmit from a transmit queue;
transmitting said linear combination of packets across a network using a sliding window protocol; and
when said intermediate node receives an innovative packet, determining from said innovative packet a newly seen packet and adding the witness of the newly seen packet to said transmit queue, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged.

27. The method of claim 26 further comprising determining if a packet is no longer involved in received linear combinations of packets, and removing said packet from said transmit queue.

28. The computer readable storage medium of claim 26 wherein said network comprises a network operating in accordance with a Transmission Control Protocol (TCP).

29. A transmitting node comprising:
a memory;
a processor;
a communications interface;
an interconnection mechanism coupling the memory, the processor and the communications interface; and
wherein the memory is encoded with an application providing network coding based flow control, that when performed on the processor, provides a process for processing information, the process causing the transmitting node to perform the operations of:
determining a linear combination of packets to transmit from a transmit queue;
transmitting said linear combination of packets across a network using a sliding window protocol; and
receiving an acknowledgement (ACK), wherein a packet is acknowledged when a receiving node receives the linear combination of packets and determines which packet of said linear combination of packets has been newly seen, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged.

30. The transmitting node of claim 29 further comprising removing a packet from said transmit queue which has been acknowledged.

31. The transmitting node of claim 29 wherein said network comprises a network operating in accordance with a Transmission Control Protocol (TCP).

32. The transmitting node of claim 29 wherein said transmitting said linear combination of packets across a network using a sliding window protocol further comprises including coding coefficients in a header of said linear combination of packets.

33. The transmitting node of claim 29 wherein said linear combination of packets is linearly independent of previously transmitted linear combinations of packets and therefore conveys new information.

34. The transmitting node of claim 29 wherein said ACK comprises receiving a request of a byte sequence number of a first byte of a first unseen packet.

35. A receiving node comprising:
a memory;
a processor;
a communications interface;
an interconnection mechanism coupling the memory, the processor and the communications interface; and
wherein the memory is encoded with an application providing network coding based flow control, that when performed on the processor, provides a process for processing information, the process causing the receiving node to perform the operations of:
receiving a linear combination of packets across a network using a sliding window protocol;
determining whether a packet is newly seen, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged; and
transmitting an acknowledgement (ACK), wherein a packet is acknowledged when the receiving node receives the linear combination of packets and determines which packet of said linear combination of packets has been newly seen.

36. The receiving node of claim 35 wherein said network comprises a network operating in accordance with a Transmission Control Protocol (TCP).

37. The receiving node of claim 35 further comprising maintaining a buffer of linear combinations of packets that have not been decoded yet.

38. The receiving node of claim 35 further comprising delivering decoded packets to a node.

39. The receiving node of claim 35 wherein said ACK comprises receiving a request of a byte sequence number of a first byte of a first unseen packet.

40. An intermediate node comprising:
a memory;
a processor;
a communications interface;
an interconnection mechanism coupling the memory, the processor and the communications interface; and
wherein the memory is encoded with an application providing network coding based flow control, that when performed on the processor, provides a process for processing information, the process causing the intermediate node to perform the operations of:
receiving a linear combination of packets;
determining a linear combination of packets to transmit from a transmit queue;
transmitting said linear combination of packets across a network using a sliding window protocol; and
wherein when said intermediate node receives an innovative packet, determining from said innovative packet a newly seen packet and adding the witness of the newly seen packet to said transmit queue, wherein said determining whether a packet is newly seen includes retrieving coding coefficients from a header of said linear combination of packets, appending said coding coefficients to a basis matrix, and performing a Gaussian elimination to determine which packet is newly seen so that the newly seen packet can be acknowledged.

41. The intermediate node of claim 40 further comprising determining if a packet is no longer involved in received linear combinations of packets, and removing said packet from said transmit queue.

42. The intermediate node of claim 40 wherein said network comprises a network operating in accordance with a Transmission Control Protocol (TCP).

\* \* \* \* \*